United States Patent
Guo

(10) Patent No.: US 10,149,223 B2
(45) Date of Patent: Dec. 4, 2018

(54) MOBILE HANDOVER MANAGEMENT METHOD, APPARATUS AND SYSTEM IN WIRELESS COMMUNICATION NETWORK

(71) Applicant: SONY CORPORATION, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 132 days.

(21) Appl. No.: 14/649,143

(22) PCT Filed: Nov. 13, 2013

(86) PCT No.: PCT/CN2013/087028
§ 371 (c)(1),
(2) Date: Jun. 2, 2015

(87) PCT Pub. No.: WO2014/090068
PCT Pub. Date: Jun. 19, 2014

(65) Prior Publication Data
US 2015/0319668 A1    Nov. 5, 2015

(30) Foreign Application Priority Data

Dec. 10, 2012  (CN) .......................... 2012 1 0530182

(51) Int. Cl.
| H04W 36/32 | (2009.01) |
| H04W 72/04 | (2009.01) |
| H04W 4/029 | (2018.01) |
| H04W 52/02 | (2009.01) |

(52) U.S. Cl.
CPC .......... H04W 36/32 (2013.01); H04W 4/029 (2018.02); H04W 52/0216 (2013.01); H04W 72/048 (2013.01); *Y02D 70/10* (2018.01)

(58) Field of Classification Search
None
See application file for complete search history.

(56) References Cited

U.S. PATENT DOCUMENTS 7,305,238 B2    12/2007  Gabara
2004/0203779 A1*  10/2004  Gabara ................ H04W 36/32
                                                              455/436
(Continued)

FOREIGN PATENT DOCUMENTS

| CN | 1274252 A | 11/2000 |
| CN | 1376425 A | 10/2002 |

(Continued)

OTHER PUBLICATIONS

International Search Report dated Feb. 20, 2014 in PCT/CN13/087028 filed Nov. 13, 2013.

*Primary Examiner* — Hassan A Phillips
*Assistant Examiner* — Gautam Sharma
(74) *Attorney, Agent, or Firm* — Xsensus, LLP

(57) ABSTRACT

A mobile management handover system includes circuitry that determines available resources of candidate target handover cells of a user device. The circuitry then select a target handover cell from the candidate target handover cells based on at least one of the available resources of each of the candidate target handover cells and a residency duration of the user device within the candidate target handover cells, and requests reservation of the available resources by the target handover cell.

18 Claims, 12 Drawing Sheets

(56) References Cited

U.S. PATENT DOCUMENTS

| | | | |
|---|---|---|---|
| 2005/0026619 A1* | 2/2005 | Jha | H04W 64/00 455/441 |
| 2005/0181794 A1* | 8/2005 | Rajkotia | H04W 36/24 455/436 |
| 2006/0083199 A1* | 4/2006 | Yang | H04L 29/06027 370/331 |
| 2009/0047970 A1* | 2/2009 | Kim | H04W 28/26 455/450 |
| 2009/0247162 A1 | 10/2009 | Yasuoka et al. | |
| 2010/0027507 A1* | 2/2010 | Li | H04W 36/0055 370/331 |

FOREIGN PATENT DOCUMENTS

| | | |
|---|---|---|
| CN | 101316400 | 12/2008 |
| CN | 101483895 A | 7/2009 |
| CN | 102300274 A | 12/2011 |
| CN | 102572982 | 7/2012 |
| JP | 2004-7627 A | 1/2004 |
| JP | 2011-166583 A | 8/2011 |
| WO | WO 01/72081 A1 | 9/2001 |

\* cited by examiner (a) non-adjacent (b) adjacent (c) compatible

MOBILE HANDOVER MANAGEMENT METHOD, APPARATUS AND SYSTEM IN WIRELESS COMMUNICATION NETWORK

FIELD OF THE INVENTION

The present disclosure relates to a mobile handover management method, apparatus and system in a wireless communication network.

BACKGROUND OF THE INVENTION

With the rapid development of computer and communication technique, information network is evolving rapidly toward a Next Generation Network (NGN) on the basis of IP. One of the most important features of the NGN is that a plurality of wireless techniques coexists and forms a heterogeneous wireless access network. The heterogeneous wireless access network can be classified into a Wide Area Network (WAN), a Metropolitan Area Network (MAN), a Local Area Network (LAN), a Personal Area Network (PAN) and the like in view of coverage range, and can be classified into a Point-to-Multipoint Single-hop Network, a Multi-hop Network, a Mesh Network, an Ad Hoc and the like in view of network architecture. Those heterogeneous wireless access networks form a three-dimensional coverage geographically, and cooperate to provide a user with a ubiquitous and content-rich wireless multimedia service.

In the heterogeneous network, the network density and the complexity of the network layout are increased, causing a great challenge to mobile handover management, particularly to the mobile handover management of a mobile device that is moving in a middle or high speed.

SUMMARY OF THE INVENTION

It is provided a mobile handover management method, apparatus and system in a wireless communication network in some embodiments of this disclosure, for realizing rapid and effective cell handover of a mobile device that is moving.

A brief overview of the disclosure is given hereinafter, for providing basic understanding of some aspects of the disclosure. It should be understood that this brief overview is not an exhaustive overview about the disclosure. It is not intended to determine the key or important part of the disclosure, and not to define the scope of the disclosure. Its object is only to give some concepts in a simplified form for serving as a preamble of the more-detailed description discussed later.

In an exemplary aspect of the disclosure, it is provided a mobile handover management apparatus in a wireless communication network. The mobile handover management apparatus includes: a candidate cell determination unit configured to, for a mobile device in the wireless communication network, according to a motion trajectory of the mobile device obtained through prediction, select a plurality of candidate handover cells to be passed through by the motion trajectory in the wireless communication network to form a candidate handover cell sequence of the mobile device; and a target cell determination unit configured to generate a target handover cell sequence of the mobile device according to a motion velocity, a motion direction and the candidate handover cell sequence of the mobile device, the target handover cell sequence comprising a plurality of target handover cells to which the mobile device will hand over sequentially when moving along the motion trajectory.

In another exemplary aspect of the disclosure, it is provided a mobile handover management method in a wireless communication network. The mobile handover management method includes: for a mobile device in the wireless communication network, according to a motion trajectory of the mobile device obtained through prediction, selecting a plurality of candidate handover cells to be passed through by the motion trajectory in the wireless communication network to form a candidate handover cell sequence of the mobile device; and generating a target handover cell sequence of the mobile device according to a motion velocity, a motion direction and the candidate handover cell sequence of the mobile device, the target handover cell sequence comprising a plurality of target handover cells to which the mobile device will hand over sequentially when moving along the motion trajectory.

In another exemplary aspect of the disclosure, it is provided a mobile user device in a wireless communication network. The mobile user device includes: a receiving unit configured to receive a target handover cell sequence for the mobile user device, which is generated by a mobile handover management entity in the wireless communication network according to a motion trajectory of the mobile user device obtained through prediction, the target handover cell sequence comprising a plurality of target handover cells to which the mobile device will hand over sequentially when moving along the motion trajectory; and a handover unit configured to hand over to a corresponding target handover cell sequentially according to the target handover cell sequence when the mobile user device moves along the motion trajectory.

In another exemplary aspect of the disclosure, it is provided a mobile handover management method in a wireless communication network. The mobile handover management method includes: receiving, by a mobile user device in the wireless communication network, a target handover cell sequence for the mobile user device, which is generated by a mobile handover management entity in the wireless communication network according to a motion trajectory of the mobile user device obtained through prediction, the target handover cell sequence comprising a plurality of target handover cells to which the mobile device will hand over sequentially when moving along the motion trajectory; and handing over to a corresponding target handover cell sequentially according to the target handover cell sequence when the mobile user device moves along the motion trajectory.

In another exemplary aspect of the disclosure, it is provided a wireless communication system. The wireless communication system includes the mobile handover management apparatus and the mobile user device.

In another exemplary aspect of the disclosure, it is provided a motion estimation apparatus for estimating a motion parameter of a mobile device in a wireless communication network. The motion estimation apparatus includes: a trajectory obtaining unit configured to obtain a motion trajectory of the mobile device in the wireless communication network; and an estimation unit configured to estimate the motion parameter of the mobile device according to a motion status of a projection point of the mobile device on the motion trajectory.

In another exemplary aspect of the disclosure, it is provided a motion estimation method for estimating a motion parameter of a mobile device in a wireless communication network. The motion estimation method includes: obtaining a motion trajectory of the mobile device in the wireless communication network; and estimating the motion parameter of the mobile device according to a motion status of a projection point of the mobile device on the motion trajectory.

In another exemplary aspect of the disclosure, it is provided a mobile handover management apparatus in a wireless communication network. The mobile handover management apparatus includes: an available resource determining module configured to determine an available resource of a candidate handover cell when a mobile device in the wireless communication network needs to perform cell handover; and a handover control module configured to control the cell handover of the mobile device according to the available resource of the candidate handover cell.

In another exemplary aspect of the disclosure, it is provided a mobile handover management method in a wireless communication network. The mobile handover management method includes: determining an available resource of a candidate handover cell when a mobile device in the wireless communication network needs to perform cell handover; and controlling the cell handover of the mobile device according to the available resource of the candidate handover cell.

Further, it is provided in the disclosure a computer program for implementing any one of the above methods.

Further, it is provided in the disclosure a computer program product at least in the form of a computer-readable medium, on which a computer program code for implementing any one of the above methods is recorded.

Additional exemplary aspects of the disclosure are provided as follows.

For example, a mobile management handover system includes circuitry that determines available resources of candidate target handover cells of a user device. The circuitry then select a target handover cell from the candidate target handover cells based on at least one of the available resources of each of the candidate target handover cells and a residency duration of the user device within the candidate target handover cells, and requests reservation of the available resources by the target handover cell.

In another example, a method of mobile handover management includes determining, with circuitry, available resources of candidate target handover cells of a user device. The method then selects a target handover cell from the candidate target handover cells based on at least one of the available resources of each of the candidate target handover cells and a residency duration of the UE within the candidate target handover cells, and requests reservation of the available resources by the target handover cell.

In a further example, a non-transitory computer-readable medium is encoded with computer-readable instructions that, when executed by a computer, cause the computer to perform a method that includes determining, available resources of candidate target handover cells of a user device. The method also selects a target handover cell from the candidate target handover cells based on at least one of the available resources of each of the candidate target handover cells and a residency duration of the UE within the candidate target handover cells, and requests reservation of the available resources by the target handover cell.

BRIEF DESCRIPTION OF THE DRAWINGS

The above and other objects, features and advantages of the disclosure will be understood more readily referring to the description of the embodiment of the disclosure in conjunction with the drawings. The components in the drawings are not drawn proportionally, but only for illustrating the principle of the disclosure. In the drawings, the same or similar technical features or components will be denoted with the same or similar reference signs.

DETAILED DESCRIPTION OF THE INVENTION

Figure 1:
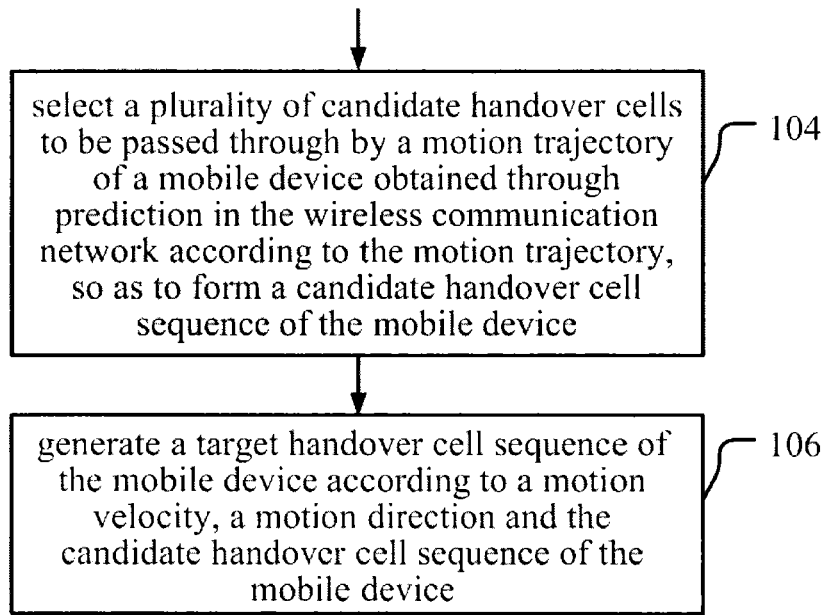
FIG. 1 is a schematic flow chart showing a mobile handover management method according to an embodiment of the disclosure.

Embodiments of the disclosure will be described referring to the drawings. The element or feature described in a drawing or an embodiment of the disclosure can be combined with the element or feature described in one or more of other drawings or embodiments. It should be noted that the illustration and description of the components and processes having no relation with the disclosure and known by those skilled in the art are omitted in the drawings and descriptions for clarity.

It is provided a mobile handover management method, apparatus and system in a wireless communication network in some embodiments of the disclosure, for realizing rapid and effective cell handover of a mobile device that is moving.

FIG. 1 is a schematic flow chart showing a mobile handover management method in a wireless communication network according to an embodiment of the disclosure. The method shown in FIG. 1 can be implemented by a mobile handover management entity (or referred to as a mobile handover management apparatus) in the wireless communication network. The wireless communication network described here may include one or more wireless communication system, such as a Global System for Mobile communication (GSM), a 3$^{rd}$ Generation (3G) communication system, a Long Term Evolution (LTE) communication system or a WiFi communication network. The mobile handover management entity may be a wireless network controller or manager provided between the one or more wireless communication systems, such as a server which is interconnected with various wireless communication networks in a wired or wireless manner and has a mobile handover management function. Alternatively, the mobile handover management entity may be provided in a certain base station in the wireless communication network as a portion of the base station. Alternatively, the mobile handover management entity may be provided separately in a plurality of base stations in the wireless communication network. For example, when the mobile device is moving in a certain region of the wireless communication network, the function of the mobile handover management entity can be implemented by a certain cell (base station) in this region, and when the mobile device moves to another region in the wireless communication network, the function of the mobile handover management entity can be implemented by a certain cell (base station) in the another region. That is to say, in the case where the mobile handover management entities are provided in a plurality of base stations separately, the function of the mobile handover management entity can be implemented by any one of the plurality of base stations. The mobile handover management entity can be interconnected with the cells in the wireless communication network via a backbone network for information exchange. Moreover, the "mobile device" described herein refers to a user device that is moving in the wireless communication network (for example, an electronic apparatus, such as a mobile phone, or a portable computer, a tablet computer or a PDA accessing to the wireless communication network), and is also referred to as a "mobile user device".

As shown in FIG. 1, the mobile handover management method includes step 104 and step 106.

Firstly, in step 104, for a mobile device in the wireless communication network, according to a motion trajectory of the mobile device obtained through prediction, a plurality of candidate handover cells to be passed through by the motion trajectory are selected in the wireless communication network. A candidate handover cell sequence of the mobile device is formed by the selected plurality of candidate handover cells.

A future motion trajectory of the mobile device can be acquired or predicted in many ways. For example, in the case of assistance of navigation information, the motion trajectory of the mobile device can be obtained based on the navigation information. As another example, in the case of no assistance of navigation information, the future motion trajectory of the mobile device can be predicted based on an existing motion trajectory thereof.

Figure 2:
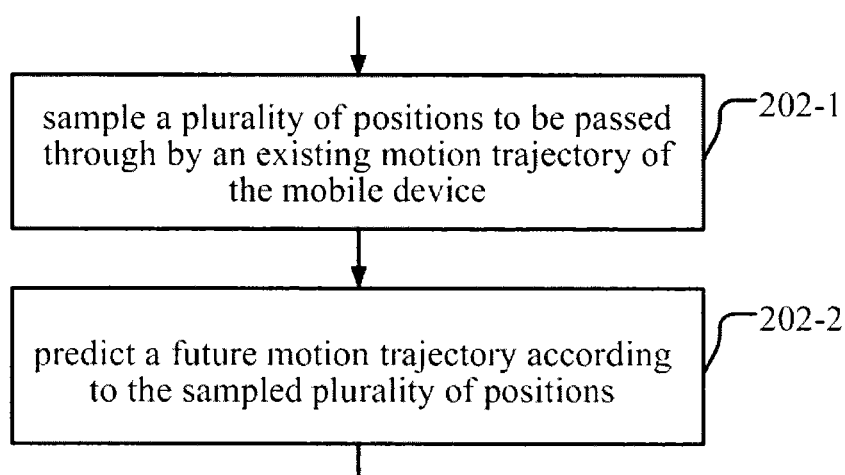
FIG. 2 is a schematic flow chart showing an example of a method for predicting a motion trajectory of a mobile device without assistance of navigation information.

An example of a method for predicting a motion trajectory of a mobile device without assistance of navigation information is shown in FIG. 2.

As shown in FIG. 2, firstly, in step 202-1, a plurality of positions in the existing motion trajectory of the mobile device is sampled. For example, a position coordinate $(x_i, y_i)$ (i=0, 1, 2, . . . , N; N>1) of the mobile device at time $t_i$ can be acquired. As an example, if the mobile device itself has the ability to obtain a geographic position, for example, the mobile device is provided with a Global Positioning System (GPS), the position information of the mobile device can be provided by the mobile device actively to the mobile handover management entity. As another example, the position information of the mobile device can be provided to the mobile handover management entity by measuring via a network, for example, the position information of the mobile device can be obtained by a triangulation method or the like, which is not described in detail here. Moreover, it is assumed that the time interval between two adjacent sampling positions is referred to as the sampling frequency, and if a plurality of mobile devices is sampled at the same sampling frequency, this sampling is referred to as static sampling. If the mobile devices are classified into a plurality of types based on the motion rates of the mobile devices, and each type of mobile devices is sampled at the same sampling frequency, this sampling is referred to as half-static sampling. If the mobile devices are sampled at different sampling frequencies based on the motion rates of the mobile devices, this sampling is referred to as dynamic sampling. For example, if the motion rate of the mobile device is relatively low, the sampling frequency can be decreased, and if the motion rate of the mobile device is relatively high, the sampling frequency can be increased. The advantage is that the calculation accuracy of the trajectory is improved and the calculation amount of the sampling and the subsequent trajectory calculation is reduced.

Then, in step 202-2, the motion trajectory of the mobile device is predicted by fitting according to the sampled plurality of positions.

Various fitting methods can be adopted. Generally, in a case of a short distance, the user will select to travel along a route with the shortest distance, and the motion trajectory can be fitted with a straight line. As an example, the fitting can be implemented using a least square method. Specifically, it is assumed that sampled position points at a time sequence of $t_1, t_2, \ldots, t_n$ is sequentially $P_1, P_2, \ldots, P_n$ (n is the number of the adopted position points, and n>1), and the coordinate sequence of these position points is sequentially $(x_1, y_1), (x_2, y_2), \ldots, (x_n, y_n)$, let the equation of the motion trajectory L be y=ax+b, then by substituting the coordinates of the sampling points into this equation, resulting in a deviation $d_i$:

$$d_i = y_i - (ax_i + b)(i=1,2,\ldots,n) \quad (1),$$

where n>1. The quadratic sum of the above deviation $d_i$ is denoted as D(a, b), then D(a, b) can be represented as:

$$D(a,b) = \sum_{i=1}^{n} d_i^2 = \sum_{i=1}^{n} (y_i - ax_i - b)^2 \ (i=1, 2, \ldots, n). \quad (2)$$

To obtain the minimum value of the quadratic sum D(a, b) of the deviation, the following equation can be obtained:

$$\begin{cases} a = \dfrac{n\sum_{i=1}^{n} x_i y_i - \sum_{i=1}^{n} x_i \cdot \sum_{i=1}^{n} y_i}{n\sum_{i=1}^{n} x_i^2 - \left(\sum_{i=1}^{n} x_i\right)^2} \\ b = \dfrac{n\sum_{i=1}^{n} x_i^2 \cdot \sum_{i=1}^{n} y_i - \sum_{i=1}^{n} x_i y_i \cdot \sum_{i=1}^{n} x_i}{n\sum_{i=1}^{n} x_i^2 - \left(\sum_{i=1}^{n} x_i\right)^2} \end{cases} (i=1, 2, \ldots, n). \quad (3)$$

Based on the above equation (3), a and b can be calculated, and thereby the motion trajectory equation y=ax+b can be obtained.

It should be understood that the above least square method is only one of the examples of an fitting method for predicting the motion trajectory, and the motion trajectory can also be predicted using any other suitable fitting method, which will be not listed here one by one.

Figure 3:
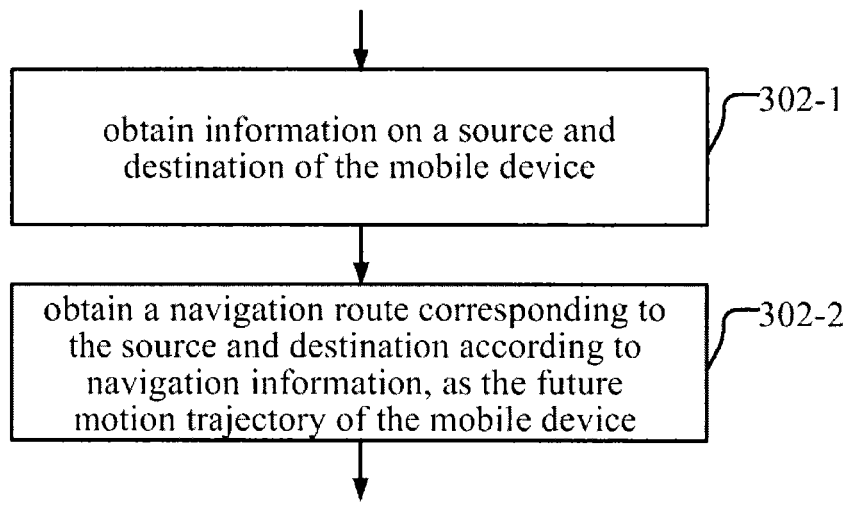
FIG. 3 is a schematic flow chart showing an example of a method for predicting a motion trajectory of a mobile device with assistance of navigation information.

An example of a method for predicting a motion trajectory of a mobile device with assistance of navigation information is shown in FIG. 3.

Specifically, in step 302-1, information on a source and destination of the mobile device are obtained. Then in step 302-2, a navigation route corresponding to the source and destination is acquired according to the navigation information, as the motion trajectory of the mobile device.

The navigation route is generally in the form of a polygonal line. To simplify the subsequent calculation, the navigation route can be divided into a plurality of straight lines. For example, the route is divided into a plurality of line segments according to the inflection points on the navigation route, and then operations are performed on each line segment.

As an example, the above method for predicting the future motion trajectory of the mobile device can be implemented by the mobile handover management entity. In this case, before step 104, the method may further include a step of predicting the motion trajectory of the mobile device (not shown in FIG. 1). As another example, the future motion trajectory of the mobile device can also be predicted by other related device (such as the mobile device itself, a GPS device that can provide the navigation information or GPS information about the mobile device, or the like), and is sent to the mobile handover management entity. After the predicted motion trajectory of the mobile device is obtained, a plurality of candidate handover cells to be passed through by the motion trajectory can be selected.

The respective candidate handover cells in the candidate handover cell sequence are the cells to be passed through by the motion trajectory of the mobile device. These candidate handover cells are arranged in an order in which these candidate handover cells are passed through by the motion trajectory (according to the motion direction of the mobile device), and thereby the candidate handover cell sequence is formed. The candidate handover cell sequence can be selected in many ways. For example, the candidate handover cells can be selected using the method described referring to FIGS. 4 to 6 hereinafter.

Figure 4:
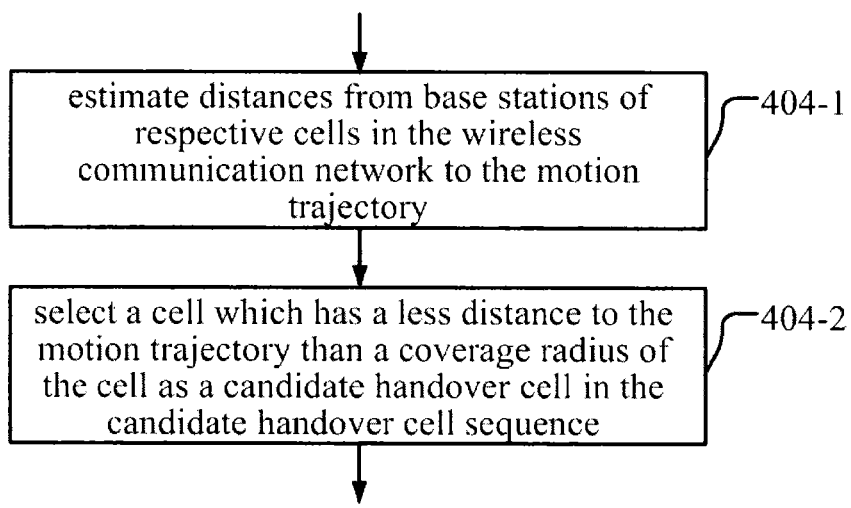
FIG. 4 is a schematic flow chart showing an example of selecting a candidate handover cell for a mobile device according to a predicted motion trajectory.

An example of selecting a candidate handover cell for a mobile device according to a predicted motion trajectory is shown in FIG. 4. In this example, all the cells in the wireless communication network are considered.

As shown in FIG. 4, firstly, in step 404-1, distances from base stations of respective cells in the wireless communication network to the motion trajectory are estimated.

The coverage information of respective cells can be obtained by the mobile handover management entity from a radio environment map of the wireless communication network, and generally includes the position ($BS_{i,x}$, $BS_{i,y}$) and the signal coverage radius of the base station $BS_i$ and the like (i=1, 2, ..., m; where m is the number of the cells). As an example, the distances from respective base stations to the motion trajectory can be calculated by projecting the positions of the base stations onto the motion trajectory. For example, assuming that a projection point of the base station $BS_i$ on the motion trajectory L is pptl($BS_i$, L), the distance from the base station $BS_i$ to its projection point pptl($BS_i$, L) can be calculated as the distance from this base station to the motion trajectory.

Then, in step 404-2, a cell which has a less distance to the motion trajectory than a coverage radius of the cell is selected as the candidate handover cell in the candidate handover cell sequence.

For example, assuming that a projection point of the base station $BS_i$ on the motion trajectory L is pptl($BS_i$, L), a cell which meets the condition of $|BS_i - pptl(BS_i, L)| < r_i$ is selected as a candidate handover cell. The base stations $BS_i$ that meet the above condition are arranged in an order of the coordinates of the projection points of the base stations according to the motion direction of the mobile device, and thereby the candidate handover cell sequence is formed. For example, if the motion direction of the mobile device is in accordance with the ascending order of the horizontal coordinates, the base stations $BS_i$ are arranged in the ascending order of the horizontal coordinates of their projection points pptl($BS_i$, L); and else, the base stations $BS_i$ are arranged in the decreasing order of the horizontal coordinates of their projection points pptl($BS_i$, L).

Figure 5:
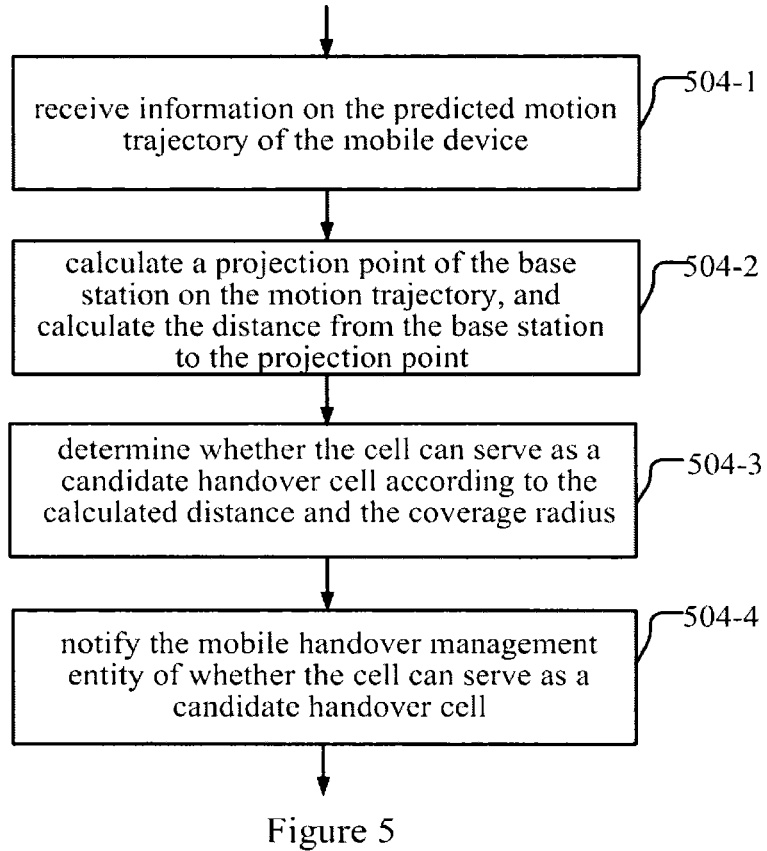
FIG. 5 is a schematic flow chart showing another example of selecting a candidate handover cell for a mobile device according to a predicted motion trajectory.

The method shown in FIG. 4 can be implemented by the mobile handover management entity. As another example, the above step of calculating the distances from respective base stations to the motion trajectory can be implemented by respective base stations respectively. Such an example is shown in FIG. 5. As shown in FIG. 5, in step 504-1, the base station $BS_i$ of each cell receives information on the predicted motion trajectory L of the mobile device from the mobile handover management entity. In step 504-2, the base station $BS_i$ calculates its projection point pptl($BS_i$, L) of the mobile device on the motion trajectory L, and calculates the distance from the base station $BS_i$ itself to the projection point. In step 504-3, the base station $BS_i$ judges whether the base station $BS_i$ can serve as a candidate handover cell. Specifically, if the distance is less than the signal coverage radius of the base station, that is, $|BS_i-\text{pptl}(BS_i, L)|<r_i$, it indicates that this base station can serve as a candidate handover cell; and else this base station can not serve as a candidate handover cell. Finally, in step 504-4, the base station feeds back to the mobile handover management entity the information on whether the base station can serve as a candidate handover cell. If the base station $BS_i$ can serve as a candidate handover cell, the base station $BS_i$ also feeds back its projection point to the mobile handover management entity. Accordingly, the mobile handover management entity sends to the base stations of respective cells the information on the predicted motion trajectory L of the mobile device, and receives the information on whether the base stations of respective cells can serve as a candidate handover cell fed back from the base stations (and may also receive information on the projection points of the base stations on the motion trajectory).

The respective candidate handover cells in the candidate handover cell sequence can be arranged in an order of the projection points of the base stations of respective candidate handover cells on the motion trajectory according to the motion direction of the mobile device. Specifically, according to the information fed back from respective base stations, the mobile handover management entity arranges the base stations $BS_i$ that can serve as the candidate handover cell in an order of the projection points of the base stations according to the motion direction of the mobile device, so as to form the candidate handover cell sequence.

Figure 6:
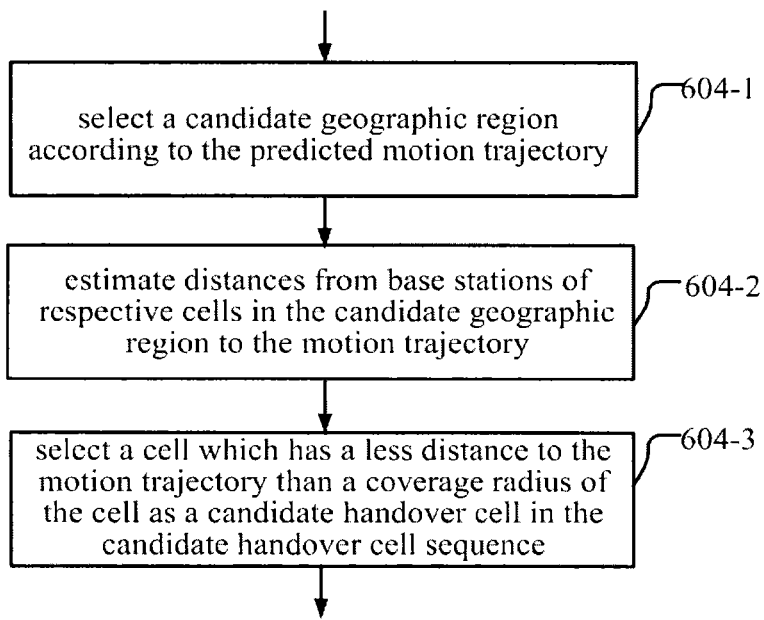
FIG. 6 is a schematic flow chart showing another example of selecting a candidate handover cell for a mobile device according to a predicted motion trajectory.

Another example of selecting a candidate handover cell for a mobile device according to a predicted motion trajectory is shown in FIG. 6. In this example, not all the cells in the wireless communication network are considered, but only the cells in the candidate geographic region through which the predicted motion trajectory passes are considered.

As shown in FIG. 6, in step 604-1, a candidate geographic region along the motion trajectory is selected.

Figure 7:
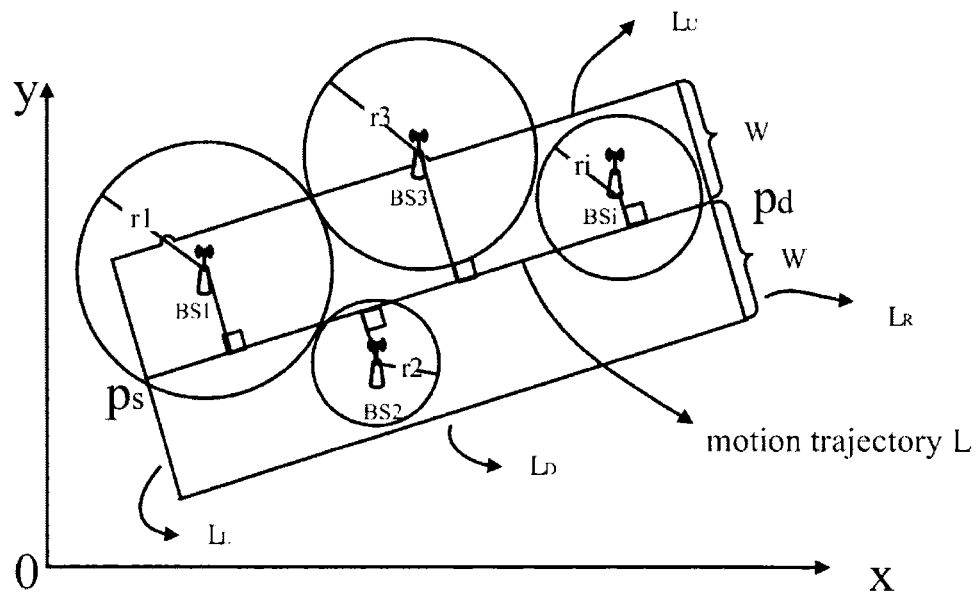
FIG. 7 is a schematic diagram showing an example of a candidate geographic region according to a predicted motion trajectory.

The candidate geographic region can be estimated by the mobile handover management entity according to the predicted motion trajectory of the mobile device. An example of a candidate geographic region is shown in FIG. 7. As shown in FIG. 7, the candidate geographic region can be indicated by a sliding window (a rectangular formed by straight lines $L_U$ and $L_D$ in parallel with the motion trajectory L of the mobile device and straight lines $L_L$ and $L_R$ perpendicular to L, as shown in the figure)

Still taking FIG. 7 as an example, the projection points of the base stations $BS_1$, $BS_2$, $BS_3$ and $BS_4$ of the cells in the sliding window as shown on the motion trajectory L can be calculated, and the distances from respective base stations to their projection points can be calculated, as the distances from the base stations to the motion trajectory. As shown in FIG. 7, the distance w from $L_U$ and $L_D$ to L is not beyond the maximum value of the signal coverage range of all the cells; the crossing point $P_S$ between $L_L$ and L is the projection point of the mobile device on L currently; and the crossing point $P_D$ between $L_R$ and L is the end point of a piece of effective motion trajectory of the mobile device. In the case of assistance of the navigation information, inflection points of the navigation route can be selected as the end point of the effective motion trajectory. In the case of no assistance of the navigation information, the end point of the effective motion trajectory is determined cooperatively by the prediction accuracy of the trajectory, the motion velocity of the mobile device, the calculating ability of the mobile handover management entity and the like. The higher the prediction accuracy is, the longer the path of the effective motion trajectory is, and vice versa. The higher the motion velocity of the mobile device is, the longer the path of the effective motion trajectory is, and vice versa. The stronger the calculating ability of the mobile handover management entity is, the longer the path of the effective motion trajectory is, and vice versa. The mobile handover management entity can obtain the coverage information of respective cells from a radio environment map of the wireless communication network which generally includes the positions ($BS_{i,x}$, $BS_{i,y}$) of the base stations $BS_i$ (i=1, 2, 3, and 4), and then select respective base stations in the sliding window of the candidate geographic region. Specifically, $BS_{i,x}$ can be substituted into the equations of the four straight lines $L_U$, $L_D$, $L_L$ and $L_R$, respectively obtaining $BS^U_{i,y}$, $BS^D_{i,y}$, $BS^L_{i,y}$, and $BS^R_{i,y}$. If $BS^D_{i,y}<BS^D_{i,y}<BS^U_{i,x}$, and $BS^L_{i,y}<BS_{i,y}<BS^R_{i,y}$ are both met, the base station $BS_i$ is in the sliding window of the candidate geographic region.

In step 604-2, distances from base stations of respective cells in the candidate geographic region to the motion trajectory are estimated. This step is similar to the method for calculating the distance in the above example, and is not described repeatedly. Then, in step 604-3, a cell which has a less distance to the motion trajectory than a coverage radius of the cell is selected as a candidate handover cell in the candidate handover cell sequence. Steps 604-2 and 604-3 can be implemented by the mobile handover management entity, and can also be implemented by respective base stations, which is not described repeatedly here.

After the candidate handover cell sequence is obtained, in step 106, a target handover cell sequence of the mobile device is generated according to the motion velocity, the motion direction and the candidate handover cell sequence of the mobile device. The target handover cell sequence may include a plurality of target handover cells to which the mobile device will hand over sequentially when moving along the motion trajectory.

The information on the motion velocity and the motion direction of the mobile device can be obtained in many ways. For example, the information on the motion velocity and the motion direction of the mobile device can be submitted by the mobile device itself to the serving cell or the mobile handover management entity. For another example, the motion direction and the motion velocity of the mobile device can be estimated using the method to be described referring to FIG. 15 hereinafter. Moreover, the target handover cell sequence can be generated in various ways. For example, the target handover cell sequence can be generated using the method to be described referring to FIGS. 8 to 12 hereinafter.

After the target handover cell sequence of the mobile device is obtained, the mobile handover management entity can notify respective target handover cells related to in this sequence of the information on the mobile device. The mobile device can hand over to the respective target handover cells in accordance with the target handover cell sequence sequentially when moving along the predicted motion trajectory.

With the mobile handover management method shown in FIG. 1, rapid and effective cell handover of a mobile device that is moving can be achieved, and the system performance of the wireless communication network is improved while the quality of the handover service for the mobile device is ensured.

Figure 8:
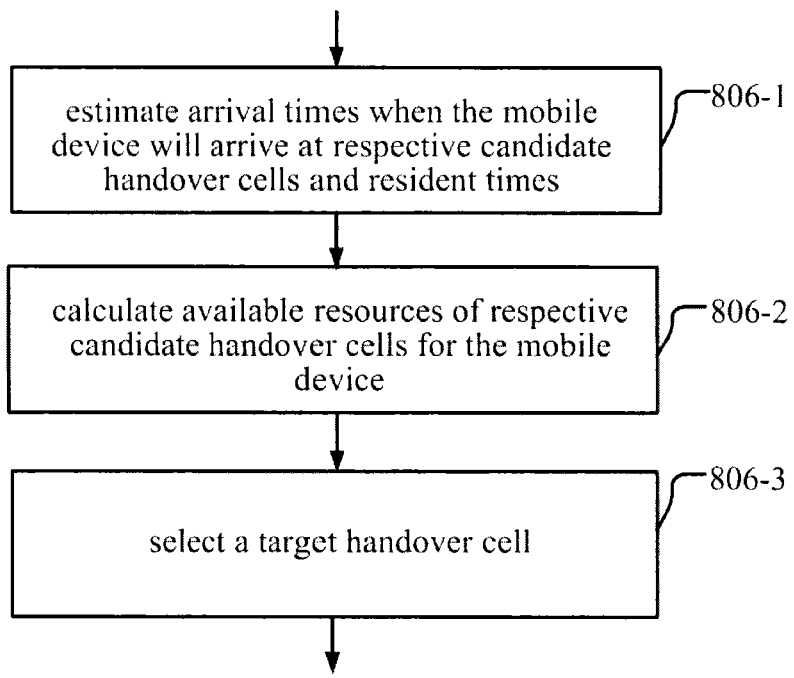
FIG. 8 is a schematic flow chart showing an example of a method for generating a target handover cell sequence according to an embodiment of the disclosure.

FIG. 8 is a schematic flow chart showing an example of a method for generating a target handover cell sequence according to an embodiment of the disclosure. This method can be performed after the candidate handover cell sequence of the mobile device is formed using the method described above.

As shown in FIG. 8, the method for generating a target handover cell sequence may include steps 806-1, 806-2 and 806-3.

In step 806-1, arrival times when the mobile device will arrive at respective candidate handover cells and resident times during which the mobile device resides in respective candidate handover cells are estimated according to the motion direction and the motion velocity of the mobile device. For example, the arrival time when the mobile device will arrive at a candidate handover cell can be estimated according to the motion velocity of the mobile device and the distance from the mobile device to the candidate handover cell along the motion trajectory. The distance for which the mobile device will move along the motion trajectory in the candidate handover cell can be estimated by the crossing point between the predicted motion trajectory and the coverage range of the candidate handover cell, and the resident time during which the mobile device resides in the candidate handover cell can be calculated according to the motion velocity of the mobile device.

In step 806-2, available resources of respective candidate handover cells for the mobile device are calculated according to the arrival times when the mobile device will arrive at the respective candidate handover cells and the resident times during which the mobile device resides in the respective candidate handover cells. For example, the resources that can be reserved for the mobile device by the candidate handover cell during the resident time are estimated according to the resource configuration of the candidate handover cell.

Then, in step 806-3, the target handover cell is selected from the candidate handover cell sequence according to a position relationship between respective candidate handover cells on the motion trajectory and according to the available resources of respective candidate handover cells for the mobile device. For example, if it is predicted that the mobile device needs to perform cell handover at a certain position on the predicted motion trajectory and there are more than one candidate handover cells at this position, the candidate handover cell that can provide the best service for the mobile can be selected according to the available resources that are reserved by respective candidate handover cells for the mobile device, as the target handover cell at this position on the motion trajectory. If it is predicted that the mobile device needs to perform cell handover at a certain position on the predicted motion trajectory and there is only one candidate handover cell at this position, this candidate handover cell is selected as the target handover cell.

As an example, relationships between available resources of respective candidate handover cells and bandwidth requirement of the mobile device can be calculated, and the target handover cell can be selected from respective candidate handover cells according to the relationships and/or the resident times. For example, the relationship between an available resource and the bandwidth requirement of the mobile device may be a ratio therebetween, as a reserved request ratio with respect to the respective candidate handover cell, and the target handover cell can be selected from respective candidate handover cells according to the reserved request ratios and/or the resident times. For example, if it is predicted that the mobile device needs to perform cell handover at a certain position on the predicted motion trajectory and there are more than one candidate handover cells at this position, the candidate handover cell having the maximum reserved request ratio can be selected as the target handover cell at this position on the motion trajectory. As another example, power levels required by the mobile device to move in respective candidate handover cells can be estimated, and the target handover cell can be selected from respective candidate handover cells according to one or more of the reserved request ratio, the resident time and the power level.

Figure 9:
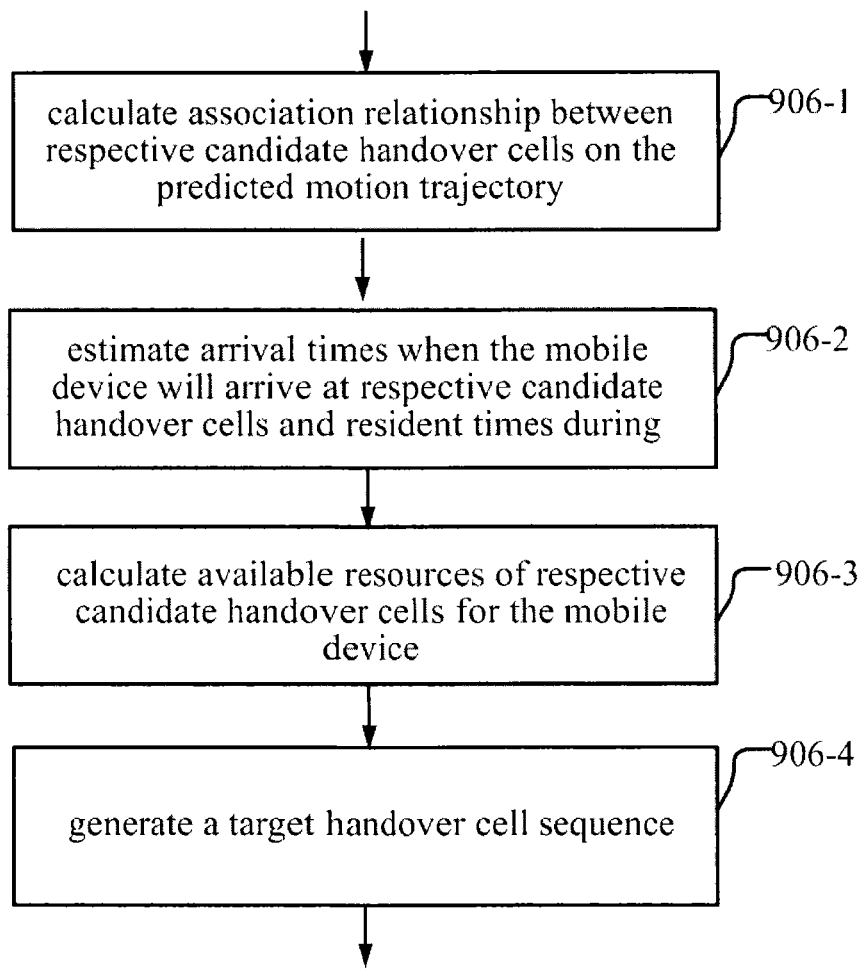
FIG. 9 is a schematic flow chart showing another example of a method for generating a target handover cell sequence according to an embodiment of the disclosure.

Another example of a method for generating a target handover cell sequence is shown in FIG. 9.

As shown in FIG. 9, firstly, in step 906-1, an association relationship between respective candidate handover cells on the predicted motion trajectory of the mobile device is calculated.

Figure 10:
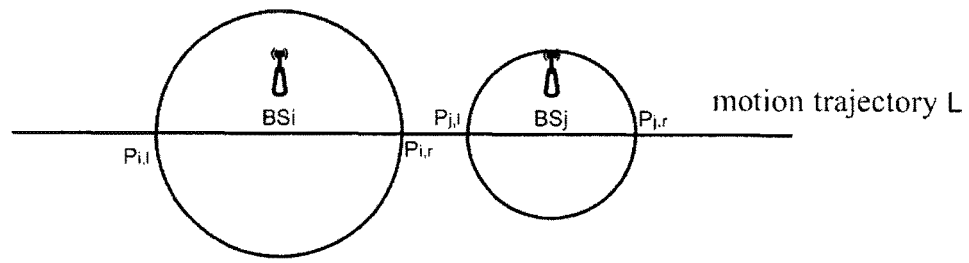
FIG. 10 is a schematic diagram showing an example of position association relationship between candidate handover cells on a motion trajectory.
Figure 10:
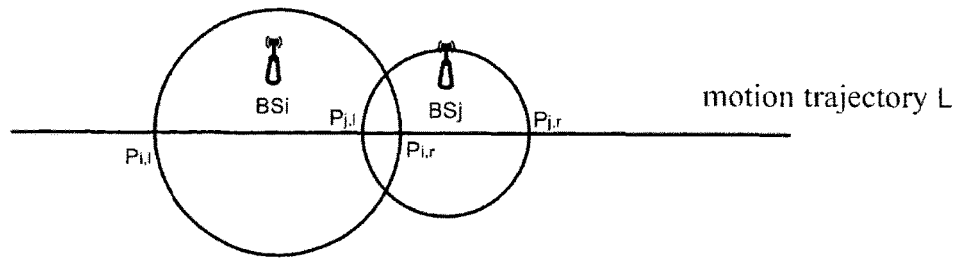
Figure 10:
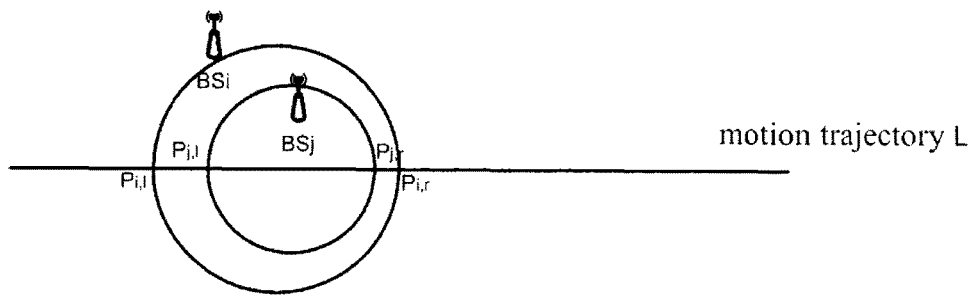
Figure 11:
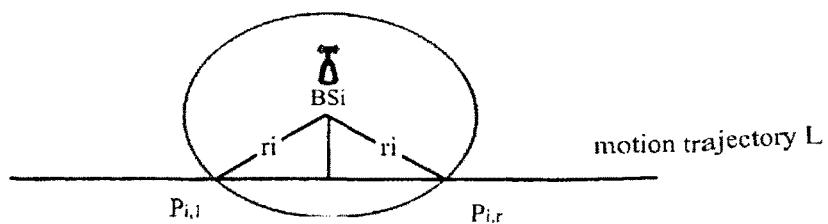
FIG. 11 is a schematic diagram showing an example of a method for calculating a crossing point between a coverage of a candidate handover cell and a motion trajectory.

The association relationship between respective candidate handover cells on the motion trajectory refers to the relationship between crossing points between the signal coverage edges of respective candidate handover cells and the predicted motion trajectory of the mobile device. Three examples of such association relationship are shown in FIG. 10. As shown in FIG. 10, by taking two cells as an example, there are three relationships. The crossing points between the signal coverage edges of the cells $BS_i$ and $BS_j$ and the motion trajectory L are respectively and $P_{i,l}$, $P_{i,r}$, and $P_{j,l}$, $P_{j,r}$. The cells $BS_i$ and $BS_j$ as shown in FIG. 10(a) have no overlapped part on the motion trajectory L, and the corresponding crossing points on the motion trajectory are sequentially $P_{i,l}$, $P_{i,r}$, $P_{j,l}$, and $P_{j,r}$, and this position relationship between two cells is referred to as "non-adjacent", which means that the mobile device moving along the motion trajectory L can not hand over from cell $BS_i$ to cell $BS_j$ seamlessly. The cells $BS_i$ and $BS_j$ as shown in FIG. 10(b) have a overlapped part on the motion trajectory L, and the corresponding crossing points on the motion trajectory are sequentially $P_{i,l}$, $P_{j,l}$, $P_{i,r}$, and $P_{j,r}$, and this position relationship between two cells is referred to as "adjacent", which means that the mobile device moving along the motion trajectory L can hand over from cell $BS_i$ to cell $BS_j$. This adjacent relationship can be indicated as $BS_i \rightarrow BS_j$ using a directed arc. The part of $BS_j$ on the motion trajectory L is completely contained in the cell $BS_i$ shown in FIG. 12(c), and the corresponding crossing points on the motion trajectory L are sequentially $P_{i,l}$, $P_{j,l}$, $P_{j,r}$, and $P_{i,r}$, and this position relationship between two cells is referred to as "compatible", which means that the mobile device moving along the motion trajectory L can hand over from $BS_i$ to $BS_j$ and hand over back to $BS_i$. This relationship can be indicated as $BS_i \leftrightarrows BS_j$. By taking the two cells shown in FIG. 10 as an example, in step 906-1, the crossing points $P_{i,l}$ and $P_{i,r}$ between the coverage range of the candidate handover cell $BS_i$ and the motion trajectory L can be calculated firstly. An example of a method for calculating the crossing points is shown in FIG. 11. As shown in FIG. 11, assuming that the part of the motion trajectory is denoted as L, the base station $BS_i$ has a position of ($BS_{i,x}$, $BS_{i,y}$) and a signal coverage radius $r_i$, then two points on the trajectory L from which the distance to $BS_i$ is $r_i$ are obtained and respectively denoted as $P_{i,l}$ and $P_{i,r}$, and the two points are the crossing points between the coverage range of this base station and the motion trajectory, where $P_{i,l}$ has a horizontal coordinate less than that of $P_{i,r}$.

Figure 12A:
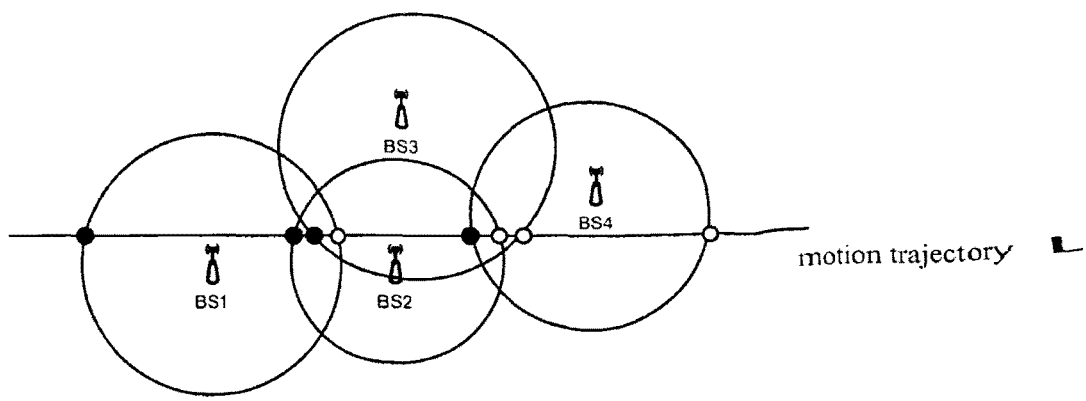
FIG. 12(a) is a schematic diagram showing distribution of a plurality of candidate handover cells on a motion trajectory.

The crossing points between the coverage range of the base stations in all the candidate handover cells and the motion trajectory are arranged in an ascending order of the horizontal coordinates, resulting in a crossing point sequence. Then, an association relationship diagram between respective candidate handover cells on the motion trajectory L can be generated according to the association relationship between the cells as shown in FIG. 10. The nodes in the diagram is the cells, and the cells are connected by a directed arc for indicating the adjacent relationship (i.e., seamless handover can be implemented between the cells). Distribution of a plurality of candidate handover cells on a motion trajectory is shown in FIG. 12(*a*), and an association relationship diagram between respective candidate handover cells formed by the above method is shown in FIG. 12(*b*).

Then, in step 906-2, a time parameter of the mobile device is calculated. The time parameter described here includes arrival times when the mobile device will arrive at respective candidate handover cells and resident times during which the mobile device resides in respective candidate handover cells.

For example, assuming that the current position of the mobile device is $P_s$, the crossing points between the edge of the coverage range of the cell $BS_i$ and the motion trajectory L are respectively $P_{i,l}$ and $P_{i,r}$, then the distance from the mobile device to $BS_i$ is $||P_{i,l}-P_s|$, and the distance for which the mobile device will reside in the coverage range of $BS_i$ is $|P_{i,r}-P_{i,l}|$. If the mobile device moves at a speed $v$, the arrival time when the mobile device is predicted to arrive at the cell is $$t_{i,arrival} = \frac{|p_{i,l} - p_s|}{v},$$

and the resident time is $$t_{i,residence} = \frac{|p_{i,r} - p_{i,l}|}{v}.$$

The resident time can be used as a first weight $W_{i,l}$ of each node (i.e. cell) in the association relationship diagram as shown in FIG. 12(*b*).

To calculate whether the handover operation can be performed between cells having adjacent or compatible relationship, it is further necessary to calculate the resident time during which the mobile device resides in the overlapped region of the cells. For the cells $BS_i$ and $BS_j$ having the adjacent relationship (as shown in FIG. 10(*b*)), the overlapped distance on the motion trajectory L is $|P_{i,r}-P_{j,l}|$, and the predicted resident time during which the mobile device resides in this overlapped region is $$t_{i,j} = \frac{|p_{i,r} - p_{j,l}|}{v}.$$

For the cells $BS_i$ and $BS_j$ having the compatible relationship (as shown in FIG. 10(*c*)) where $BS_i$ contains $BS_j$, assuming that the overlapped distance on the motion trajectory L is half of the distance of the contained cell $BS_j$ on the motion trajectory L:

$$\frac{|p_{j,r} - p_{j,l}|}{2},$$

the predicted resident time during which the mobile device resides in this overlapped region is $$t_{i,j} = \frac{|p_{j,r} - p_{j,l}|}{2v}.$$

The estimated resident time during which the mobile device resides in the overlapped region can be used as the weight $W_{i \to j}$ of the directed arc in the association relationship diagram shown in FIG. 12(*b*).

Then, in step 906-3, an available resource of the candidate handover cell for the mobile device is calculated, such as the resource that can be reserved by the candidate handover cell for the mobile device during the time period defined by the estimated arrival time and resident time.

For example, the mobile handover management entity can send the arrival time $t_{i,arrival}$ when the mobile device is predicted to arrive at the candidate handover cell and the resident time $t_{i,residence}$ may be sent to the base station $BS_i$ of the corresponding cell, and also send the current bandwidth requirement $BW_{request}$ of the mobile device to the base station $BS_i$. It is predicted by the base station $BS_i$ whether enough reserved resource can be provided for the mobile device. It is determined by the base station $BS_i$ whether the system total resource capacity, other than that required for meeting the current user bandwidth requirement, that required for meeting the user bandwidth requirement generated by handovers before $t_{i,arrival}$, and that required for meeting the user bandwidth requirement newly generated before $t_{i,arrival}$, is enough to provide the reserved resource $BW_{reserved}$ for the mobile device.

The respective candidate handover cells can be classified according to the relationship between the reserved resources and the bandwidth requirement of the mobile device. In the target handover cell sequence, the candidate handover cell that can provide more reserved resources has a higher priority level, and the candidate handover cell that can provide less reserved resources has a lower priority level.

Assuming that the system capacity of the cell $BS_i$, is $C_i$, the total current user bandwidth requirement is $BW_{current}$, the total bandwidth requirement of the arrived handover users (not including the target mobile device) at time $t_{i,arrival}$ is $BW_{HO\_in}$, the predicted total bandwidth requirement of the leaving handover users is $BW_{HO\_out}$, the predicted total user bandwidth requirement generated newly is $BW_{NEW\_in}$, and the predicted total ended user bandwidth requirement is $BW_{NEW\_out}$, then the reserved resource $BW_{i,reserved}$ that can be provided by the cell for the mobile device can be calculated in the following equation:

$$BW_{i,reserved}=C_i-(BW_{current}+BW_{HO\_in}-BW_{HO\_out}+BW_{NEW\_in}-BW_{NEW\_out}).$$

Here $BW_{current}$ can be calculated according to the current actual user bandwidth requirement of the cell $BS_i$; $BW_{HO\_in}$ and $BW_{HO\_out}$ can be calculated according to the time and bandwidth request information provided by mobile users; and $BW_{NEW\_in}$ and $BW_{NEW\_out}$ can be calculated according to the statistical information of the cell $BS_i$.

In addition, the reserved request ratio $$SQR_i = \frac{BW_{i,reserved}}{BW_{request}}$$

can be calculated, which represents the ratio of the reserved resource to the bandwidth requirement of the mobile device. This parameter can be normalized, and the normalized reserved request ratio is $$SQR = \max\left\{\min\left\{\frac{BW_{i,reserved}}{BW_{request}}, 1\right\}, 0\right\}.$$

Figure 12B:
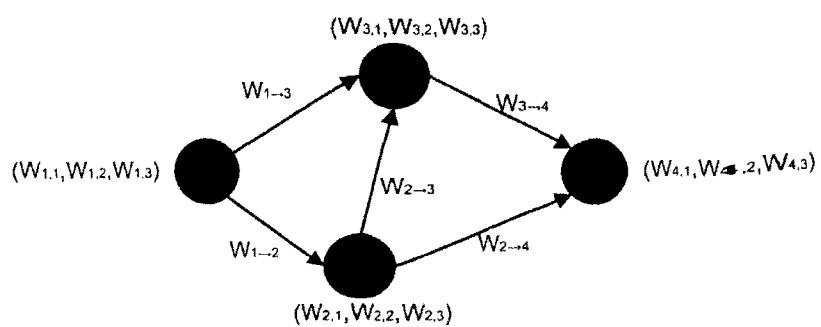
FIG. 12(b) is a schematic diagram showing an association relationship between respective candidate handover cells.

The reserved request ratio can be used as a second weight $W_{i,2}$ of each node in the association relationship diagram as shown in FIG. 12(b).

A power level $p_i$ required by the mobile device to move in the candidate handover cell to communicate normally can also be predicted according to the motion feature of the mobile device (this prediction can be performed by the base station $BS_i$ in the cell, and can also be performed by mobile handover management entity). The predicted power level can be used as a third weight $W_{i,3}$ of each node in the association relationship diagram as shown in FIG. 12(b).

Finally, in step 906-4, a target handover cell sequence is generated.

By taking the association relationship diagram of the respective cells on the motion trajectory L as shown in FIG. 12(b) as an example, in FIG. 12(b), each node represents one candidate handover cell $BS_i$, each node is assigned the first weight $W_{i,1}=t_{i,residence}$, which represents the predicted resident time during which the mobile device will resides in the cell $BS_i$. Each node is also assigned the second weight $W_{i,2}=SQR_i$, which represents the reserved request ratio of the cell $BS_i$ for the mobile device. Moreover, each node is assigned the third weight $w_{i,3}=p_i$, which represents the predicted power level of the mobile device in the cell $BS_i$. The cells $BS_i$ and $BS_j$ are connected via a directed arc for indicating the adjacent relationship. The directed arc is assigned the weight $W_{i\rightarrow j}=t_{i,j}$, which represents the resident time during which the mobile device will resides in the overlapped region between the cells $BS_i$ and $BS_j$.

In the example as shown in FIG. 12(b), generating the target handover cell sequence is equivalent to obtaining a directed path in the association relationship diagram which complies with a predetermined optimization object. Here, the optimization object may include: minimizing the handover times of the mobile device, maximizing the system capacity of all the cells on the motion trajectory L, or the like. It is a NP-hard problem to find an optimal solution of any optimization object on the association relationship diagram. Hereinafter, an approximating method is provided for finding a sub-optimal solution, to achieve a compromise between the system performance and the calculation complexity. As an example, if minimizing the handover times of the mobile device is taken as the optimization object, the first weight of the node can be used as a first criterion for classifying the candidate handover cells into a plurality of priority levels. The greater the first weight is, the higher the priority level is. Firstly, the cells having the first priority level are selected and arranged in an order thereof along the motion trajectory L. If no directed arc exists between consecutive two cells $BS_i$ and $BS_j$ in this arrangement (that is, the association relationship thereof is non-adjacent), a directed path from $BS_i$ to $BS_j$ is searched for on the association relationship diagram. For example, in FIG. 12(b), the first weights of the nodes of the cells $BS_1$ and $BS_4$ belong to the first priority level, the cells $BS_1$ and $BS_4$ are selected according to the first criterion, and the directed path from $BS_1$ to $BS_4$ needs to be searched for. In searching for the directed path, the second weights of the nodes can be used as the second criterion, and all the cells between the cells $BS_i$ and $BS_j$ are classified into a plurality of priority levels. The greater the second weight is, the higher the priority level is. The cells having the first priority level are selected and arranged in an order thereof along the motion trajectory L. If no directed arc is provide between consecutive two cells $BS_i$ and $BS_j$ in this arrangement, the nodes with the second priority level are taken into consideration. For example, in FIG. 12(b), the cells $BS_2$ and $BS_3$ both can form a directed path between the cells $BS_1$ and $BS_4$, and the cell $BS_2$ has a higher second weight, then the cell $BS_2$ is selected according to the second criterion. In the case where the first criterion is the same as the second criterion, the third weight of the node can be used as the third criterion, so that the cells having the lower power level have a higher priority level, for reducing the power consumption of the mobile device. It can be ensured that the arc weight in the selected directed path is beyond a threshold $\delta_{HO}$ which represents the time required by the mobile device to perform the handover operation. As another example, if maximizing the system capacity of all the cells on the motion trajectory L is taken as the optimization object, the second weight of the node can be set as the first criterion, the first weight of the node can be set as the second criterion, and the third weight of the node can be set as the third criterion. The target handover cell sequence can be obtained with the method in the example described above, which is not repeated here.

As described above, the target handover cell sequence of the mobile device when moving along the predicted motion trajectory can be obtained using the method as shown in FIG. 8 or FIG. 9. The mobile handover management entity can notify the respective target handover cells related in the sequence that the respective cell has been selected as a target handover cell, and notify these cells of the information of the mobile device, such as the predicted arrival time, resident time, bandwidth requirement and the like. These cells write the mobile device into their handover user queue and reserve resources for the mobile device, such as the resource $BW_{i,reserved}=\min\{BW_{i,reserved}, BW_{request}\}$ as calculated above. If a certain target handover cell cannot meet source reservation for the mobile device due to a change in the result of resource allocation decision, the certain target handover cell will notify the mobile handover management entity to initiate handover management updating.

The mobile handover management entity may further notify the mobile device of the generated target handover cell sequence. The mobile device can take the target handover cell sequence as the preferred handover selection, that is, the mobile device can hand over sequentially according to the target handover cell sequence when moving along the predicted motion trajectory. As an example, the cell handover of the mobile device can be initiated by power measurement. For example, when the power of the current serving cell $BS_i$ received by the mobile device during the continuous measurement is lower than a threshold, the cell handover can be initiated, and the handover operation is performed by taking the next handover cell $BS_j$ in the target handover cell sequence as a preferred handover target. As another example, the handover can be initiated by motion information assistance power measurement. For example, when the mobile device moves into a region within the coverage range of the current serving cell $BS_i$ in which the power is approximately lower than the power threshold (for example, moves to the crossing point $P_{j,i}$ of the next cell $BS_j$ with the motion trajectory L), the power measurement is initiated, and when the power of the current serving cell $BS_i$ received by the mobile device is lower than the threshold, the cell handover is initiated, and the handover operation is performed by taking the next handover cell $BS_j$ in the target handover cell sequence as a preferred handover target. As another example, the handover may also be initiated by the motion information. For example, when the mobile device moves into a region within the coverage of the current serving cell $BS_i$ in which the power is approximately lower than the power threshold (for example, moves to the crossing point $P_{j,l}$ of the next cell $BS_j$ with the motion trajectory L), the handover is initiated, and the handover operation is performed by taking the next handover cell $BS_j$ in the target handover cell sequence as a preferred handover target.

As an embodiment, after the target handover cell sequence of the mobile device when mobbing along the predicted motion trajectory is obtained using the method described above, the updating of handover management can be further initiated.

Figure 13:
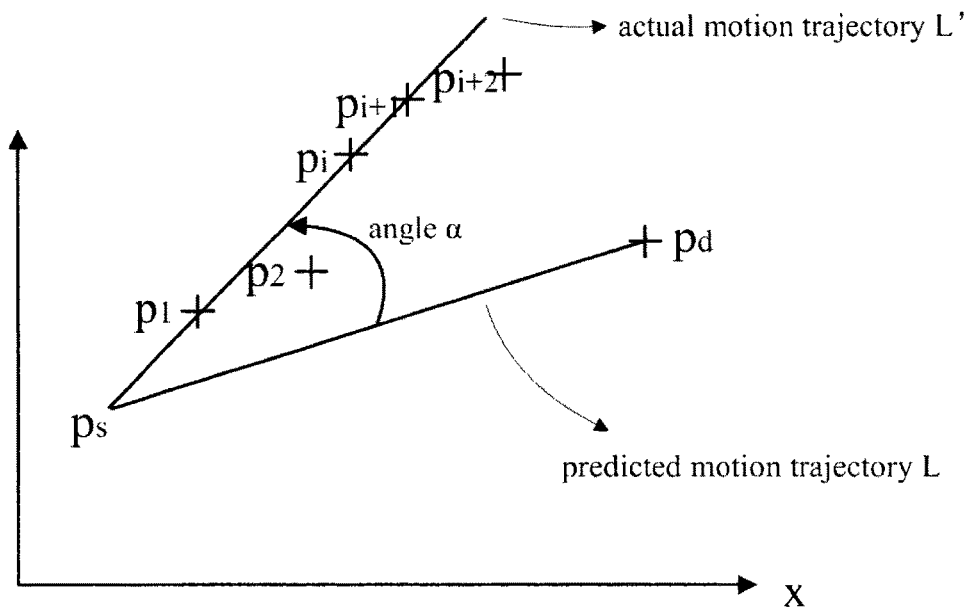
FIG. 13 is a schematic diagram showing a comparison between an actual motion trajectory and a predicted motion trajectory.

As an example, when the motion direction of the mobile device changes, the previously predicted motion trajectory L is not consistent with the actual motion trajectory, and the motion feature of the mobile device needs to be re-predicted. Specifically, the position points of the mobile device can be re-sampled during the moving of the mobile device, and the actual motion trajectory L' is compared with the previously predicted motion trajectory L. The comparison is shown in FIG. 13. As shown in FIG. 13, assuming that the initial position of the mobile device is $p_s$, the destination position is $p_d$, the previously predicted motion trajectory is L, the position points that are re-sampled after the change of the motion direction are $p_1, p_2, \ldots, p_i, p_{i+1}, p_{i+2}$, and the actual motion trajectory that is defined by these re-sampled position points is L'. If the angle α between the actual motion trajectory and the previously predicted motion trajectory is greater than a preset threshold $\delta_{angle}$, it is necessary to re-predict the motion trajectory of the mobile device. The motion trajectory can be re-predicted using the method described referring to FIGS. 2 and 3 above, which is not repeated here.

As another example, when the motion velocity of the mobile device changes, the time parameters can be re-estimated, such as arrival times when the mobile device will arrive at respective candidate handover cells and/or resident times, and the target handover cell sequence is re-calculated. Specifically, assuming that the current actual motion velocity of the mobile device is v', the actual motion velocity is compared with the previously predicted motion velocity v, and if the difference between the two velocities is greater then a preset threshold $\delta_{velocity}$, the time parameters such as arrival times when the mobile device will arrive at respective candidate handover cells and/or resident times are re-estimated, and the target handover cell sequence is re-calculated. The time parameters can be re-calculated and the target handover cell sequence can be re-calculated using the method described above, which is not repeated here.

As another example, when the reserved resource of the target handover cell for the mobile device changes, the reserved request ratio of the available resource of the handover cell to the bandwidth requirement of the mobile device can be re-calculated, and the target handover cell sequence can be re-generated according to the re-calculated reserved request ratio. Specifically, the reserved request ratio of the target handover cell can be re-calculated during the moving of the mobile device, and if the variation of the ratio is beyond a preset threshold, the target handover cell sequence is re-generated.

In an example, if the mobile device fails to hand over from the current serving cell to the next target handover cell, the method in step 106 as shown in FIG. 1 can be used to re-select a target handover cell.

The various embodiments of the mobile handover management method described above can be applied to the scenario where the mobile device hands over between cells having the same Radio Access Technology (RAT).

Figure 14:
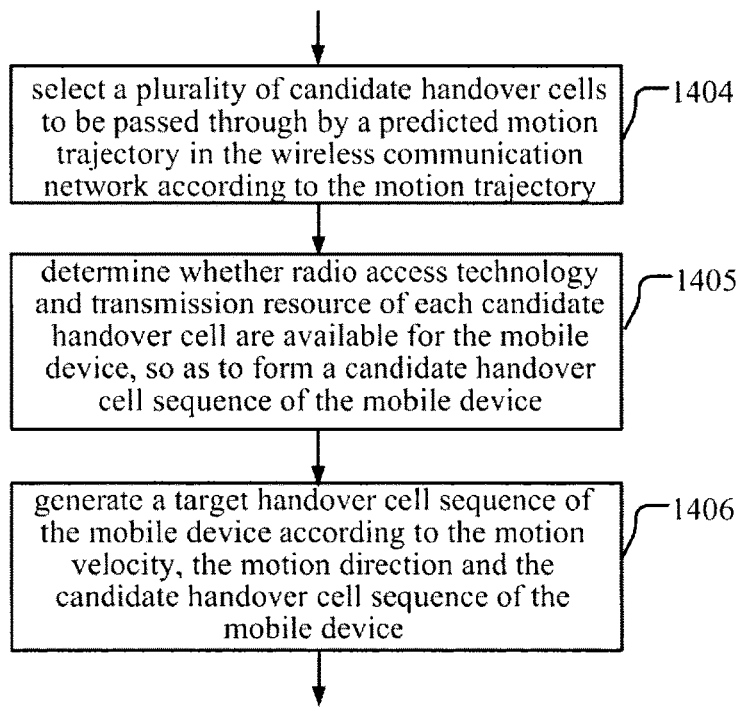
FIG. 14 is a schematic flow chart showing a mobile handover management method according to another embodiment of the disclosure.

An embodiment of a mobile handover management method in a scenario where the wireless communication network include cells having different radio access technologies is shown in FIG. 14. The cell handover of the mobile device in the scenario where the wireless communication network include cells having different radio access technologies is referred to as vertical handover. The method shown in FIG. 14 can be implemented by a mobile handover management apparatus. In the scenario of vertical handover, the mobile handover management apparatus can be connected to various wireless communication networks via a backbone network. That is to say, the mobile handover management apparatus can make information exchange with various wireless communication networks via the backbone network.

As shown in FIG. 14, in step 1404, according to the predicted motion trajectory of the mobile device, a plurality of cells to be passed through by the motion trajectory in the wireless communication network is selected. This step is similar to step 104 described above, and the plurality of cells can be selected using the method described referring to FIGS. 4 to 6 above, which is not repeated here. As described above, the future motion trajectory of the mobile device can be predicted by the mobile handover management entity. In this case, before step 1404, the method may further include a step of predicting the motion trajectory of the mobile device (not shown in FIG. 14). As another example, the future motion trajectory of the mobile device can be predicted by other related devices (such as the mobile device itself, a GPS device that can provide the navigation information or GPS information about the mobile device, or the like), and be sent to the mobile handover management entity.

Then, in step 1405, it is determined whether the radio access technology and the transmission resource (such as frequency spectrum) of each one of the plurality of cells selected in step 1404 are available for the mobile device. In other words, the cells that having the radio access technologies and the transmission resources (such as frequency spectrums) available for the mobile device are selected from the plurality of cells, as the candidate handover cells, so as to form the candidate handover cell sequence of the mobile device. The information on the radio access technologies of various cells and the information on the frequency spectrums and variation thereof can be stored by the mobile handover management apparatus (for example, stored in the database of the mobile handover management apparatus or other types of storage devices), and can be extracted for the storage device or database when being used. Alternatively, the mobile handover management apparatus can make information exchange with the various wireless communication networks via the backbone network. The exchanged information may include the information on the radio access technologies available for the related cells (such as the candidate handover cells) and the information on the related handover cells such as the transmission resources and the variation thereof.

Then, in step 1406, the target handover cell sequence of the mobile device is generated according to the motion velocity, the motion direction and the candidate handover cell of the mobile device. The target handover cell sequence includes a plurality of target handover cells to be passes through by the mobile device when moving along the motion trajectory. This step is similar to step 106 described above, and the target handover cell sequence can be generated using the method described referring to FIGS. 8 to 12 above, which is not repeated here.

The mobile handover management method described referring to FIG. 14 can be applied to the application scenario where the mobile device hands over between the cells having different radio access technologies (i.e., the scenario where the wireless communication network includes the cells having different radio access technologies). With this mobile handover management method, the rapid and effective handover of the mobile device when moving can be realized, and the vertical handover of the mobile device can be realized.

As an example, in the scenario of vertical handover, when the radio access technology supported by and the frequency spectrum of the candidate handover cell change such that the communication of the mobile device can not be supported, the target handover cell sequence needs to be re-generated. If the radio access technology supported by and the frequency spectrum of the candidate handover cell change but the communication of the mobile device can be supported, the reserved bandwidth for the mobile device can be re-calculated. If the reserved request ratio of the reserved bandwidth changes as compared with that of the previously calculated reserved bandwidth, the target handover cell sequence needs to be re-calculated.

According to some embodiments of this disclosure, it is further provided a method for estimating (calculating) a motion feature (for example, including a motion velocity and a motion direction) of a mobile device that is moving. A method for estimating a motion feature of a mobile device according to an embodiment is shown in FIG. 15.

Figure 15:
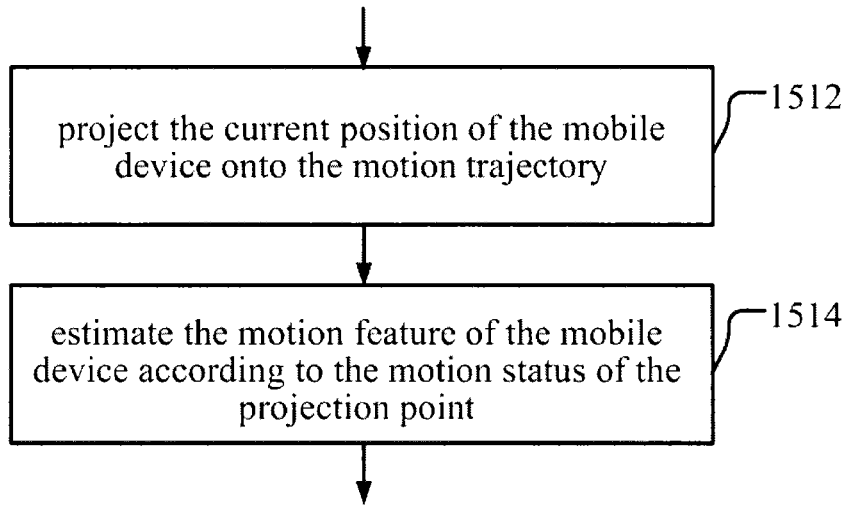
FIG. 15 is a schematic flow chart showing a method for estimating a motion feature of a mobile device according to an embodiment.

As shown in FIG. 15, in step 1512, the current position of the mobile device is projected onto the motion trajectory of the mobile device. Then, in step 1514, the motion direction and the motion velocity of the mobile device are estimated according to the motion status of the projection point of the mobile device on the motion trajectory. The motion estimation method may further include a step of obtaining the motion trajectory of the mobile device (not shown). For example, the further motion trajectory of the mobile device can be predicted using the method described above, or the motion trajectory that has been passed through by the mobile device can be obtained using the method described above, which is not repeated here.

As an example, assuming that the position point of the mobile device is $p_i$, and the projection point of the position point on the motion trajectory L can be defined as the crossing point between L and the straight line which passes through the point $p_i$ and is perpendicular to L, then the projection point can be represents as $pptl(p_i, L)$. It is assumed that the motion direction of the mobile device is $\vec{L}(a,b)$, which indicating that the mobile device moves in the direction of the motion trajectory L, and it is assumed that the motion rate of the mobile device is v, which can be calculated by calculating the distance between the projection points of the sampling position points of the mobile device on the motion trajectory L. Specifically, assuming that the distance between two sampling position points $p_1$ and $p_2$ is $|p_2-p_1|=\sqrt{(x_2-x_1)^2+(y_2-y_1)^2}$, the motion rate v can be calculate using the following equation:

$$v = \frac{|pptl(p_n, L) - pptl(p_l, L)|}{|t_n - t_l|}, \quad (4)$$

where $p_n$ and $p_l$ are two sampling position points that are passed through by the mobile device, and $t_n$ and $t_l$ are respectively the times when the mobile device passes through the position points $p_n$ and $p_l$.

In some embodiments of the disclosure, the mobile handover management method may further include a step of grouping a plurality of mobile devices with the same motion feature into the same mobile device group, and in the subsequent cell handover, the cell handover is performed on a plurality of mobile devices in the mobile device group in group. For example, a plurality of user devices in the same moving vehicle or in a plurality of vehicles moving in the same route (such as a mobile phone, or a portable computer or a tablet computer accessing to the wireless communication network) are the mobile devices with the same motion feature. Based on the same motion feature, it can be deduced that these mobile device have the same wireless access requirements, and thus the handover can be performed on these mobile devices in group.

Figure 16:
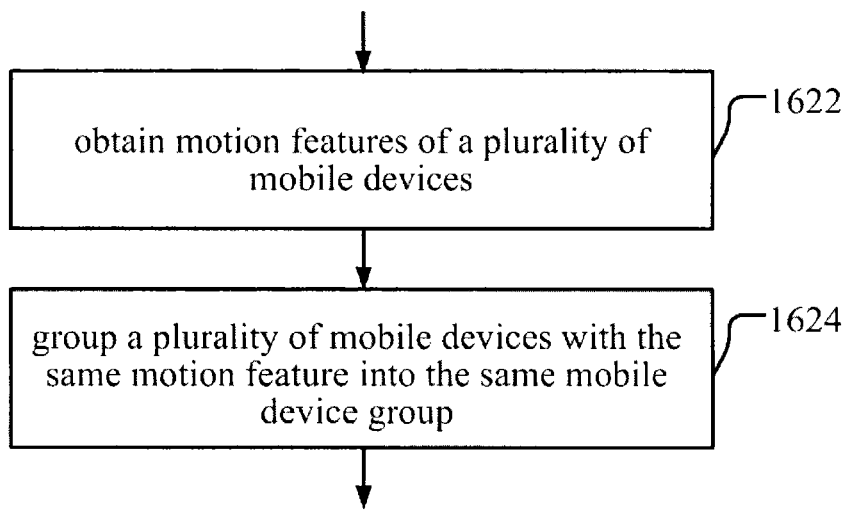
FIG. 16 is a schematic flow chart showing an example of a method for grouping a plurality of mobile devices according to a motion feature according to an embodiment.

An example of a method for grouping a plurality of mobile devices having the same motion feature into the same mobile device group according to an embodiment is shown in FIG. 16.

As shown in FIG. 16, in step 1622, motion features of a plurality of mobile device are obtained (such as the sampled position points that have been passed through, the motion direction and the motion velocity). The motion features of each mobile device can be obtained or estimated using the method described above, which is not repeated here. Then, in step 1624, a plurality of mobile devices with the same motion feature is grouped into the same mobile device group. As an example, it can be determined whether the distances between respective mobile devices keep substantially consistent at a plurality of times. It is determined that the mobile devices have the same motion feature, if the distances between respective mobile devices keep substantially consistent at a plurality of times. For example, assuming that the position sampling point sequence for a mobile device 1 and a mobile device 2 at a time sequence $t_1, t_2, \ldots, t_n$ are respectively $p_1, p_2, \ldots, p_n$ and $q_1, q_2, \ldots, q_n$. $|p_i-q_i|$ is the distance between the mobile device 1 and the mobile device 2 at time $t_i$. The expectation of the difference variable of the distance can be denoted as $E(|p_i-q_i|)$, and the variance thereof can be denoted as $Var(|p_i-q_i|)$. If the expectation and the variance are respectively less than a preset threshold $\delta_E$ and $\delta_{Var}$, i.e., formulas $E(|p_i-q_i|)<\delta_E$ and $Var(|p_i-q_i|)<\delta_{Var}$ are met, it indicates that the distance difference between the mobile device 1 and the mobile device 2 is less and keeps constant, and it can be determined that the two mobile devices are moving with the same motion feature. As another example, it can be determined whether the motion directions and the motion velocities of respective mobile devices keep substantially consistent at a plurality of times. It can be determined that the mobile devices have the same motion feature, if the motion directions and the motion velocities of respective mobile devices keep substantially consistent at a plurality of times. For example, assuming that the motion directions and the motion velocities of the mobile device 1 and the mobile device 2 are respectively $\vec{L_1}(a_1,b_1)$ and $v_1$, and $\vec{L_2}(a_2,b_2)$ and $v_2$, if the differences of the two mobiles devices in motion direction and motion velocity are respectively within the range of the preset threshold $\delta_a$, $\delta_b$ and $\delta_v$, i.e., $|a_1-a_2|<\delta_a$, $|b_1-b_2|<\delta_b$ and $|v_1-v_2|<\delta_v$, it can be determined that the two mobile devices are moving with the same motion feature.

It can be understood by those skilled in that art that the values of respective thresholds in respective embodiments or examples described above can be preset as required in practice, and the specific values of these thresholds are not defined in this disclosure.

The mobile handover management methods according to some embodiments of the disclosure have been described above. The mobile handover management apparatus according to some embodiments of the disclosure are described in the following.

Figure 17:
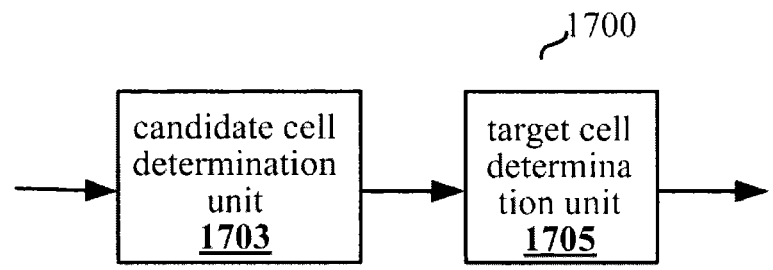
FIG. 17 is a schematic block diagram showing a mobile handover management apparatus according to an embodiment of the disclosure.

FIG. 17 is a schematic block diagram showing a mobile handover management apparatus 1700 in a wireless communication network according to an embodiment of the disclosure. The mobile handover management apparatus 1700 can implement the mobile handover management method as shown in FIG. 1. For example, the mobile handover management apparatus can be a mobile handover management entity in a wireless communication network, or a part of the mobile handover management entity.

As shown in FIG. 17, the mobile handover management apparatus includes a candidate cell determination unit 1703 and a target cell determination unit 1705.

The candidate cell determination unit 1703 is configured to select a plurality of candidate handover cells to be passed through by the predicted motion trajectory of the mobile device in the wireless communication network according to the motion trajectory. The selected plurality of candidate handover cells forms the candidate handover cell sequence of the mobile device.

As described above, the future motion trajectory of the mobile device can be obtained in many ways. For example, in the case of assistance of navigation information, the motion trajectory of the mobile device can be obtained based on the navigation information. And as another example, in the case of no assistance of navigation information, the future motion trajectory of the mobile device can be predicted based on the existing motion trajectory thereof. As an example, the motion trajectory of the mobile device can be predicted using the method described referring to FIG. 2 or 3 above, which is not repeated here.

As an example, the prediction of the motion trajectory of the mobile device can be implemented by the mobile handover management apparatus. In this case, the mobile handover management apparatus 1700 can further include a trajectory prediction unit for predicting the motion trajectory of the mobile device (not shown). As another example, the future motion trajectory of the mobile device can also be predicted by other related device (such as the mobile device itself, a GPS device that can provide the navigation information or GPS information on the mobile device, or the like), and be sent to the mobile handover management apparatus 1700.

The respective candidate handover cells in the candidate handover cell sequence are the cells to be passed through by the motion trajectory of the mobile device. These candidate handover cells are arranged in an order in which these candidate handover cells are passed through by the motion trajectory (according to the motion direction of the mobile device), and thereby the candidate handover cell sequence is formed. The candidate handover cell sequence can be selected in many ways. The candidate cell determination unit 1703 can select the candidate handover cells using the method described referring to FIGS. 4 to 7 above, which is not repeated here.

The target cell determination unit 1705 is adapted to generate a target handover cell sequence of the mobile device according to a motion velocity, a motion direction and the candidate handover cell sequence of the mobile device. The target handover cell sequence may include a plurality of target handover cells to which the mobile device will hand over sequentially when moving along the motion trajectory.

The target cell determination unit 1705 may obtain the information on the motion velocity and the motion direction of the mobile device in many ways. For example, the information on the motion velocity and the motion direction of the mobile device can be submitted by the mobile device itself to the serving cell or the mobile handover management entity. For another example, the motion direction and the motion velocity of the mobile device can be estimated using the method described referring to FIG. 15 above. Moreover, the target cell determination unit 1705 may generate the target handover cell sequence in various ways. For example, the target handover cell sequence can be generated using the method described referring to FIGS. 8 to 12 above, which is not repeated here.

After the target handover cell sequence of the mobile device is obtained, the mobile handover management apparatus can notify respective target handover cells related to in this sequence of the information on the mobile device. The mobile device can hand over to the respective target handover cells in accordance with the target handover cell sequence sequentially when moving along the predicted motion trajectory.

With the mobile handover management apparatus shown in FIG. 17, rapid and effective cell handover of a mobile device that is moving can be achieved, and the system performance of the wireless communication network is improved while the quality of the handover service for the mobile device is ensured.

Figure 18:
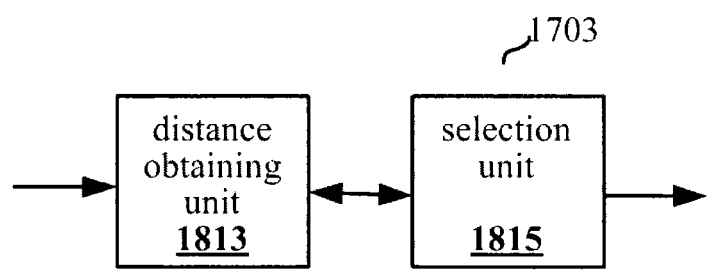
FIG. 18 is a schematic block diagram showing an example of a candidate cell determination unit in a mobile handover management apparatus.

An example of a structure of a candidate cell determination unit 1703 is shown in FIG. 18. As shown in FIG. 18, for example, the candidate cell determination unit 1703 may include a distance obtaining unit 1813 and a selection unit 1815. The distance obtaining unit 1813 is adapted to obtain distances from base stations of respective cells in the wireless communication network to the motion trajectory, and the selection unit 1815 is adapted to select a cell which has a less distance to the motion trajectory than a coverage radius of the cell as a candidate handover cell in the candidate handover cell sequence. As an example, the selection unit 1815 is further adapted to select a candidate geographic region along the predicted motion trajectory. The distance obtaining unit 1813 is further adapted to estimate distances from base stations of respective cells in the candidate geographic region to the motion trajectory. Further, the selection unit 1815 can be adapted to select a cell in the candidate geographic region which has a less distance to the motion trajectory than a coverage radius of the cell as a candidate handover cell in the candidate handover cell sequence.

Figure 19:
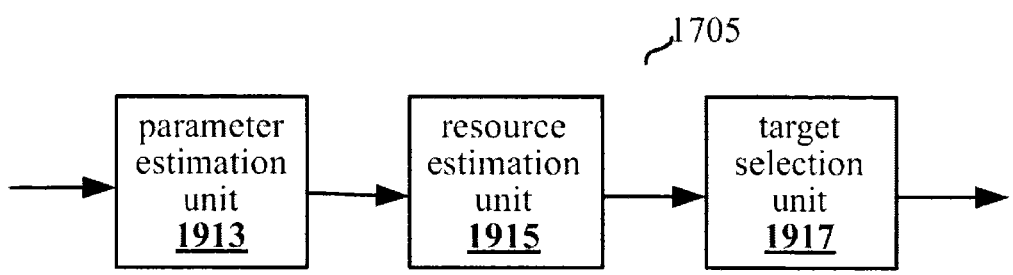
FIG. 19 is a schematic block diagram showing an example of a target cell determination unit in a mobile handover management apparatus.

An example of a structure of a target cell determination unit 1705 is shown in FIG. 19. As an example, the target cell determination unit 1705 may include a parameter estimation unit 1913, a resource estimation unit 1915 and a target selection unit 1917.

The parameter estimation unit 1913 can be adapted to estimate time parameters, such as arrival times when the mobile device will arrive at respective candidate handover cells and resident times during which the mobile device resides in respective candidate handover cells, according to the motion direction and the motion velocity of the mobile device. These time parameters can be estimated using the method described above, which is not repeated here.

The resource estimation unit 1915 can be adapted to calculate available resources of respective candidate handover cells for the mobile device according to the arrival times when the mobile device will arrive at respective candidate handover cells and the resident times during which the mobile device resides in respective candidate handover cells. For example, the resources that can be reserved for the mobile device by the candidate handover cell during the resident time are estimated according to the resource configuration of the candidate handover cell.

The target selection unit 1917 can be adapted to select the target handover cells from the candidate handover cell sequence according to a position relationship between respective candidate handover cells on the motion trajectory and according to the available resources of respective candidate handover cells for the mobile device.

As an example, the target selection unit 1917 can be adapted to calculate a ratio between available resources of respective candidate handover cells and bandwidth requirement of the mobile device, as reserved request ratios with respect to respective candidate handover cells, and select the target handover cells from respective candidate handover cells according to the reserved request ratios and/or the resident times. As another example, the parameter estimation unit 1913 can be further adapted to estimate power levels required by the mobile device to move in respective candidate handover cells, and the target selection unit 1917 can be adapted to select the target handover cells from respective candidate handover cells according to one or more of the reserved request ratio, the resident time and the power level.

Figure 20:
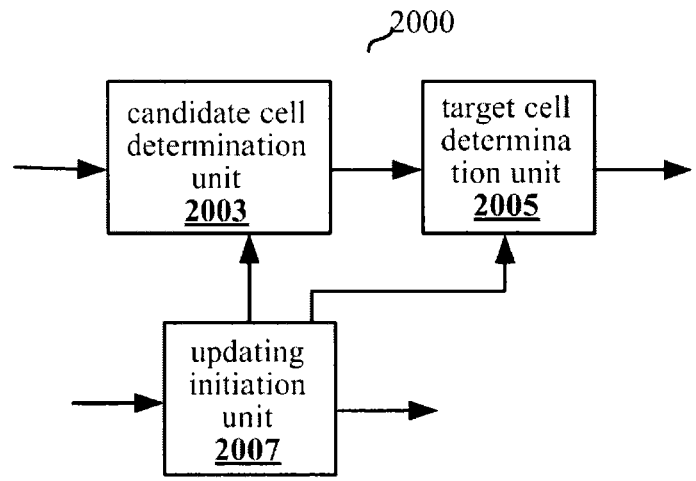
FIG. 20 is a schematic block diagram showing a mobile handover management apparatus according to another embodiment of the disclosure.

As an example, after the target handover cell sequence of the mobile device when moving along the predicted motion trajectory is obtained, the mobile handover management apparatus may initiate handover management updating. A mobile handover management apparatus 2000 according to this embodiment is shown in FIG. 20. As shown in FIG. 20, the mobile handover management apparatus 2000 includes a candidate cell determination unit 2003 and a target cell determination cell 2005, and may further include an updating initiation unit 2007.

The candidate cell determination unit 2003 and the target cell determination cell 2005 respectively have the similar function and structure as that of the candidate cell determination unit 1703 and the target cell determination cell 1705 described above, which are not repeated here.

The updating initiation unit 2007 is adapted to initiate updating of the handover information when it is detected that the mobile device or the handover cell changes. As an example, when the motion direction of the mobile device changes, the previously predicted motion trajectory L is not in accordance with the actual motion trajectory, and the updating initiation unit 2007 instructs the trajectory prediction unit 2001 to re-predict the motion trajectory of the mobile device. The trajectory prediction unit 2001 can re-predict the motion trajectory using the method described referring to FIGS. 2 and 3 above, which is not repeated here. As another example, when the motion velocity of the mobile device changes, the updating initiation unit 2007 may instruct the target cell determination unit 2005 (the parameter estimation unit) to re-estimate the time parameters, such as the arrival times when the mobile device will arrive at respective candidate handover cells and/or the resident times, and to re-calculate the target handover cell sequence. As another example, when the reserved resource of the target handover cell for the mobile device changes, the updating initiation unit 2007 may instruct the target cell determination unit 2005 (the parameter estimation unit) to re-calculate the reserved request ratio of the available resource of the handover cell to the bandwidth requirement of the mobile device, and to re-generate the target handover cell sequence according to the re-calculated reserved request ratio.

The mobile handover management apparatus described above can be applied to the scenario where the mobile device hands over between cells having the same Radio Access Technology (RAT).

In the scenario where cells supporting different radio access technologies are included in the wireless communication network, the candidate cell determination unit 1703 or 2003 may be further adapted to determine whether the radio access technology and the frequency spectrum of each candidate handover cell are available for the mobile device. If it is determined that the radio access technology and the frequency spectrum of the candidate handover cell are available for the mobile device, the candidate handover cell is saved in the candidate handover cell sequence, and otherwise, the candidate handover cell is not saved in the candidate handover cell sequence. In other words, the cells that having the radio access technologies and the frequency spectrum available for the mobile device are selected as the candidate handover cells to form the candidate handover cell sequence of the mobile device. Thus, the mobile handover management apparatus can be applied to the application scenario where the mobile device hands over between the cells having different radio access technologies (i.e., the scenario where the cells having different radio access technologies are contained in the wireless communication network). With this mobile handover management apparatus, the rapid and effective handover of the mobile device when moving can be realized, and the vertical handover of the mobile device can be realized. As described above, in the scenario of vertical handover, the mobile handover management apparatus 1700 or 2000 can be connected to various wireless communication networks via a backbone network. That is to say, the mobile handover management apparatus can make information exchange with various wireless communication networks via the backbone network. The information on the radio access technologies of various cells and the information on the frequency spectrums of the various cells and variation of the frequency spectrums can be stored by the mobile handover management apparatus 1700 or 2000 (for example, stored in the database or other types of storage devices of the mobile handover management apparatus (not shown)), and can be extracted for the storage device or database when being used. Alternatively, the mobile handover management apparatus can make information exchange with the various wireless communication networks via the backbone network. The exchanged information may include the information on the radio access technology available for the related cell (such as the candidate handover cell) and the information on the transmission resource and its variation of the related handover cell. For example, the mobile handover management apparatus may further include an information obtaining unit (not shown), for obtaining via the backbone network the information on the radio access technology that can be supported by the related cell (such as the candidate handover cell) and the information on the transmission resource used by the related cell (and the variation thereof).

As an example, in the scenario of vertical handover, when the communication of the mobile device can not be supported due to that the radio access technology supported by and the frequency spectrum of the candidate handover cell change, the target handover cell sequence needs to be re-generated. If the radio access technology supported by and the frequency spectrum of the candidate handover cell change but the communication of the mobile device can still be supported, the reserved bandwidth for the mobile device can be re-calculated. If the reserved request ratio with respect to the reserved bandwidth changes as compared with the reserved request ratio with respect to the previously calculated reserved bandwidth, the target handover cell sequence needs to be re-calculated.

It is further provided a motion estimation apparatus for estimating (calculating) the motion feature (such as motion velocity and motion direction) of the mobile device when moving in some embodiments of the disclosure. A motion estimation apparatus 2100 for estimating a motion feature of a mobile device according to an embodiment is shown in FIG. 21.

Figure 21:
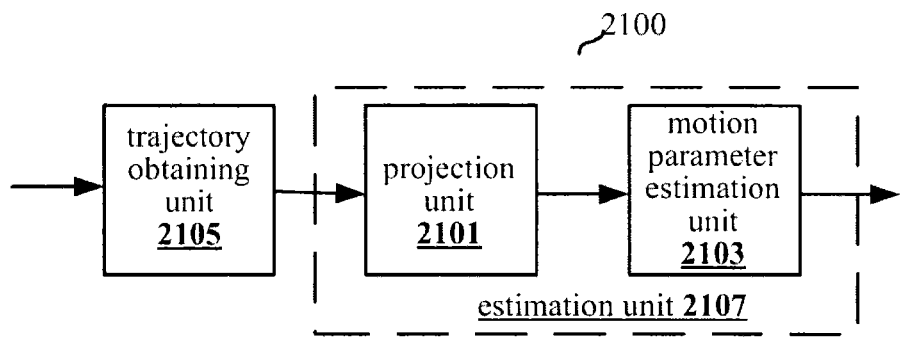
FIG. 21 is a schematic block diagram showing a motion estimation apparatus according to an embodiment of the disclosure.

As shown in FIG. 21, the motion estimation apparatus 2100 includes a trajectory obtaining unit 2105 and an estimation unit 2107. Specifically, the estimation unit 2107 may include a projection unit 2101 and a motion parameter estimation unit 2103. The trajectory obtaining unit 2105 is adapted to obtain the motion trajectory of the mobile device, for example using the method as shown in FIG. 2 or 3. The motion trajectory may also be predicted in the similar manner as the trajectory prediction unit 1701 or 2001, which is not repeated here. The estimation unit 2107 is adapted to estimate the motion direction and the motion velocity of the mobile device according to the motion status of the projection point of the mobile device on the motion trajectory. The projection unit 2101 is adapted to project the current position of the mobile device onto the predicted motion trajectory. The motion parameter estimation unit 2103 is adapted to estimate the motion direction and the motion velocity of the mobile device according to the motion status of the projection point of the mobile device on the motion trajectory. The motion parameter estimation unit 2103 may be adapted to estimate these motion parameters using the method described referring to FIG. 15 above, which is not repeated here.

The motion estimation apparatus 2100 shown in FIG. 21 can be incorporated into the mobile handover management apparatus 1700 or 2000 described above, as a portion thereof.

In some embodiments of the disclosure, the mobile handover management apparatus 1700 or 2000 may further include a grouping unit (not shown) for grouping a plurality of mobile devices having the same motion feature into the same mobile device group. Thus, in the subsequent cell handover, the cell handover can be performed on the plurality of mobile devices in the mobile device group in group. For example, a plurality of user devices in the same moving vehicle or in a plurality of vehicles moving in the same route (such as a mobile phone, or a portable computer or a tablet computer accessing to the wireless communication network) are the mobile devices with the same motion feature. The grouping unit can group a plurality of mobile devices having the same motion feature into the same mobile device group using the method described referring to FIG. 16 above. For example, the grouping unit can determine whether the distances between respective mobile devices keep substantially consistent at a plurality of times. If the distances between respective mobile devices keep substantially consistent at a plurality of times, it is determined that the mobile devices have the same motion feature. As another example, the grouping unit can determine whether the motion directions and the motion velocities of the mobile devices keep substantially consistent at a plurality of times. If the motion directions and the motion velocities of the mobile devices keep substantially consistent at a plurality of times, it is determined that the mobile devices have the same motion feature. No more details are repeated here.

Figure 22:
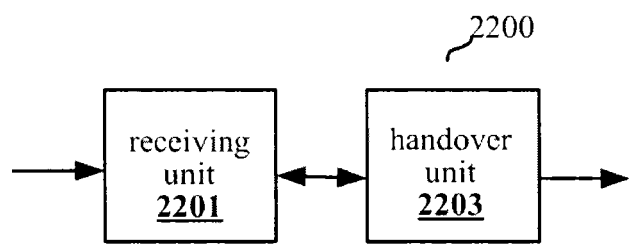
FIG. 22 is a schematic block diagram showing a mobile user device according to an embodiment of the disclosure.

A mobile user device according to some embodiments of the disclosure is shown in FIG. 22. As shown in FIG. 22, the mobile device 2200 may include a receiving unit 2201 and a handover unit 2203. The receiving unit 2201 may be adapted to receive a target handover cell sequence which is generated by a mobile handover management entity in the wireless communication network according to a predicted motion trajectory of the mobile user device. The receiving unit 2201 may receive the information on this sequence from the current serving cell, or from the mobile handover management entity directly. Thus, when the mobile device moves along the predicted motion trajectory, the handover cell 2203 may hand over to respective target handover cells sequentially according to the target handover cell sequence.

It is further provided a wireless communication system including the mobile handover management entity or apparatus and the user device described above according to an embodiment of the disclosure.

In the above description of the embodiments of the disclosure, the features described and/or illustrated for one embodiment can be used in one or more other embodiments in the same or similar manner, be combined with features in other embodiments, or be substituted by features in other embodiments.

For example, it is provided a mobile handover management method in a wireless communication network according to another embodiment of the disclosure, and the method includes: determining an available resource of a candidate handover cell when a mobile device in the wireless communication network needs to perform cell handover; and controlling the cell handover of the mobile device according to the available resource of the candidate handover cell. The available resource of the candidate handover cell can be determined using the method for determining the available resource in the embodiment disclosed in FIG. 8, and the cell handover of the mobile device can be controlled using the method for generating the target handover cell in the embodiment disclosed in FIG. 8, which is not repeated here.

As an example, the determining an available resource of a candidate handover cell may include: estimating resident time period during which the mobile device resides in the candidate handover cell and determining the available resource of the candidate handover cell for the mobile device during the resident time period.

As an example, the controlling the cell handover of the mobile device according to the available resource for the candidate handover cell may include: selecting the candidate handover cell which can provide the available resource for the mobile device as a target handover cell of the mobile device.

As an example, the estimating a resident time during which the mobile device resides in the candidate handover cell may include: estimating the resident time during which the mobile device resides in the candidate handover cell according to a motion direction and a motion velocity of the mobile device and coverage of the candidate handover cell.

The details of the respective steps in the above examples have been described in the embodiments as disclosed in FIG. 8 and the like, which is not repeated here.

Accordingly, a mobile handover management apparatus for implementing the method in a wireless communication network in the another embodiment of the disclosure described above may be further provided, and the apparatus includes: an available resource determining module configured to determine an available resource of a candidate handover cell when a mobile device in the wireless communication network needs to perform cell handover; and a handover control module configured to control the cell handover of the mobile device according to the available resource of the candidate handover cell.

As an example, the available resource determining module may estimate a resident time period during which the mobile device resides in the candidate handover cell and determines the available resource of the candidate handover cell for the mobile device during the resident time period.

As an example, the handover control module may select the candidate handover cell which can provide the available resource for the mobile device as a target handover cell of the mobile device.

As an example, the available resource determining module may estimate the resident time period during which the mobile device resides in the candidate handover cell according to a motion direction and a motion velocity of the mobile device and coverage range of the candidate handover cell.

It should be understood that the above embodiments and examples are illustrative, but not exhaustive, and the disclosure should not be deemed as to be limited to any specific embodiment or example. Moreover, in the above embodiments and examples, the steps of the method and the modules of the apparatus are denoted with numerical references. It should be understood by those skilled in the art that these numerical references are only used to distinguish these steps or modules literally, but not indicate the order thereof or any other definition.

As an example, respective steps of the above method and respective component modules and/or units of the above apparatus can be implemented as software, firmware, hardware or combination thereof. As an example, in the case of implementing as software or firmware, the programs composing the software for implementing the above method can be loaded onto a computer (such as the general computer 2300 shown in FIG. 23) having a specified hardware structure from a storage medium or network. When being mounted with various programs, the computer can implement various functions and the like.

Figure 23:
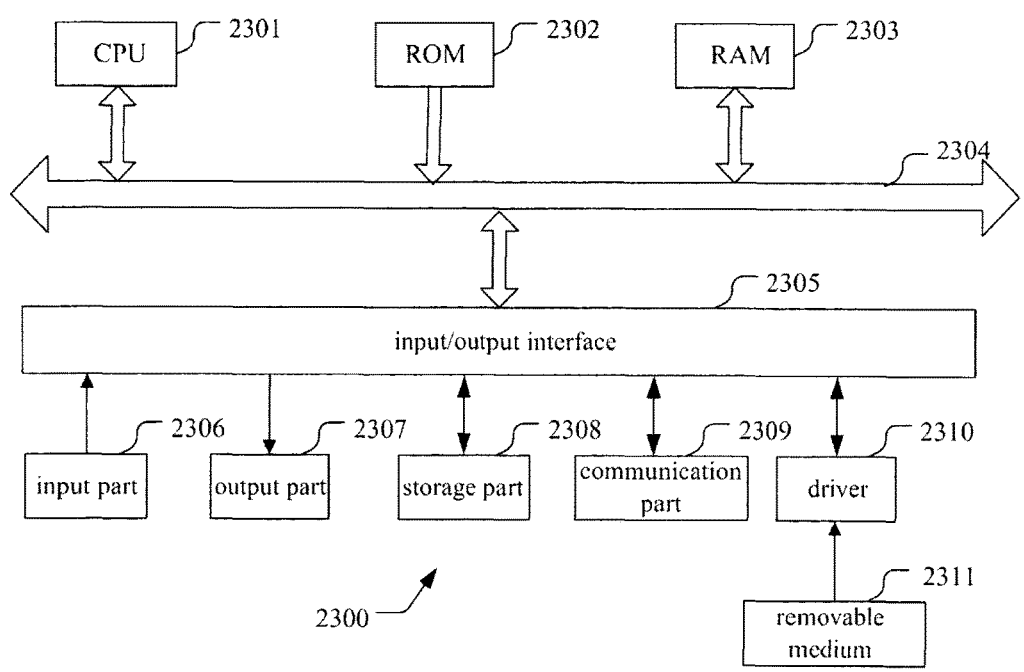
FIG. 23 is a schematic block diagram showing a structure of a computer apparatus capable of implementing an embodiment of the disclosure.

In FIG. 23, the Center Processing Unit (CPU) 2301 performs various processes according to the program stored in the Read Only Memory (ROM) 2302 or the program loaded onto the Random Access Memory (RAM) 2303 from the storage portion 2308. In RAM 2303, the data required by the CPU 2301 to perform various processes and the like is also stored as required. The CPU 2301, the ROM 2302 and the RAM 2303 are connected to each other via a bus 2304. The input/output interface 2305 is also connected to the bus 2304.

The following components are connected to the input/output interface 2305: an inputting portion 2306 (including a keyboard, a mouse and the like), an outputting portion 2307 (including a display, such as a Cathode Ray Tube (CRT), and Liquid Crystal Display (LCD), a speaker and the like), a storage portion 2308 (including a hard disk and the like), and a communication portion 2309 (including a network interface card, such as a LAN card, a modem and the like). The communication portion 2309 performs the communication process via a network such as Internet. The driver 2310 may also be connected to the input/output interface 2305 as required. A removable medium 2311, such as a magnetic disk, an optical disk, magnetic-optical disk, and semi-conductor storage can be mounted on the driver 2310 as required, so that the computer programs that are read out from there can be loaded into the storage portion 2308 as required.

In the case that the above series of processes are implemented using software, the programs composing the software can be installed from a network such as Internet or a storage medium such as a removable medium 2311.

It should be understood by those skilled in the art that the storage medium is not limited to the removable medium 2311 in which the programs are stored and which is distributed separately from the device for providing the user with the program. The example of the removable medium 2311 includes a magnetic disk (including a soft disk (registered trademark)), an optical disk (including the Compact Disk Read Only Memory (CD-ROM) and the Digital Video Disk (DVD)), a magnetic-optical disk (including the Mini-Disk (MD) (registered trademark)) and a semi-conductor storage. Alternatively, the storage medium may be the hard disk included in the ROM 2302 and the storage portion 2308, and the like in which the programs are stored, and can be distributed to the user together with the device in which it is provided.

It is further provided in the disclosure a program product in which machine-readable instruction codes are stored. The machine-readable instruction codes are read and executed by the machine, for implementing the method according to the embodiment of the disclosure described above.

Accordingly, the storage medium for carrying the program product in which machine-readable instruction codes are stored is also included in the disclosure. The storage medium includes but not limited to a software disk, an optical disk, a magnetic-optical disk, a storage card, a storage stick and the like.

Further, the present advancements may also be configured as follows.

(1) A mobile management handover system comprising: circuitry configured to determine available resources of candidate target handover cells of a user device (UE), select a target handover cell from the candidate target handover cells based on at least one of the available resources of each of the candidate target handover cells and a residency duration of the UE within the candidate target handover cells, and request reservation of the available resources by the target handover cell.

(2) The mobile management handover system OF (1), wherein the circuitry is further configured to estimate the residency duration of the UE based on a movement characteristic of the UE and cell coverage of the candidate target handover cells.

(3) The mobile management handover system of any one of (1) to (2), wherein the circuitry determines the available resources as resources available during a time of residency of the UE in a corresponding candidate target handover cell.

(4) The mobile management handover system of any one of (1) to (3), wherein the circuitry is further configured to base the selection of the target handover cell on a comparison between the available resources and UE resource requirements.

(5) The mobile management handover system of any one of (1) to (4), wherein the circuitry is further configured to base selection of the target handover cell in a transmit power required for communication between the UE and the candidate target handover cells.

(6) The mobile management handover system of any one of (1) to (5), wherein the circuitry is further configured to identify the candidate target handover cells based on a trajectory of the UE.

(7) The mobile management handover system of (6), wherein the circuitry is further configured to predict the trajectory of the UE to identify cells located about the trajectory as candidate target handover cells.

(8) The mobile management handover system of (7), wherein the circuitry is further configured to select a plurality of cells along the trajectory as a sequence of target handover cells.

(9) The mobile management handover system of any one of (6) to (7), wherein the trajectory of the UE is determined based triangulation.

(10) The mobile management handover system of any one of (1) to (9), wherein the circuitry is further configured to provide the UE with identification of the target handover cell.

(11) The mobile management handover system of any one of (1) to (10), wherein the circuitry is further configured to update selection of the target handover cell based on at least one of a change in available resources and a change in residency duration.

(12) The mobile management handover system of any one of (1) to (11), wherein the circuitry obtains the available resources from a database.

(13) The mobile management handover system of any one of (1) to (12), wherein the circuitry communicates with the candidate target handover cells to obtain the available resources.

(14) The mobile management handover system of any one of (7) to (8), wherein the circuitry determines a plurality of locations intersecting a current trajectory thereof and predicts a future trajectory of the UE based on the plurality of locations.

(15) The mobile management handover system of any one of (7) to (8) and (14), wherein the circuitry uses navigation information based on a source and destination of the UE to predict the trajectory.

(16) The mobile management handover system of any one of (7) to (8) and (14) to (15), wherein the navigation information is global positioning system (GPS) information.

(17) The mobile management handover system of any one of (7) to (8) and (14) to (16), wherein the circuitry is further configured to identify the candidate target handover cells as cells whose distance from a base station thereof to the trajectory of the UE is less than a corresponding cell coverage radius.

(18) The mobile management handover system of any one of (1) to (17), wherein the circuitry is further configured to identify candidate target handover cells based on a radio access technology thereof.

(19) A method of mobile handover management, comprising: determining, with circuitry, available resources of candidate target handover cells of a user device (UE); selecting a target handover cell from the candidate target handover cells based on at least one of the available resources of each of the candidate target handover cells and a residency duration of the UE within the candidate target handover cells; and requesting reservation of the available resources by the target handover cell.

(20) A non-transitory computer-readable medium encoded with computer-readable instructions thereon that, when executed by a computer, cause the computer to perform a method comprising: determining, available resources of candidate target handover cells of a user device (UE); selecting a target handover cell from the candidate target handover cells based on at least one of the available resources of each of the candidate target handover cells and a residency duration of the UE within the candidate target handover cells; and requesting reservation of the available resources by the target handover cell.

(21) A mobile handover management apparatus in a wireless communication network, comprising: a candidate cell determination unit configured to, for a mobile device in the wireless communication network, according to a motion trajectory of the mobile device obtained through prediction, select a plurality of candidate handover cells to be passed through by the motion trajectory in the wireless communication network to form a candidate handover cell sequence of the mobile device; and a target cell determination unit configured to generate a target handover cell sequence of the mobile device according to a motion velocity, a motion direction and the candidate handover cell sequence of the mobile device, the target handover cell sequence comprising a plurality of target handover cells to which the mobile device will hand over sequentially when moving along the motion trajectory.

(22) The mobile handover management apparatus of (1), wherein the candidate cell determination unit comprises: a distance obtaining unit configured to estimate distances from base stations of respective cells in the wireless communication network to the motion trajectory; and a selection unit configured to select a cell which has a less distance to the motion trajectory than a coverage radius of the cell as the candidate handover cell in the candidate handover cell sequence.

(23) The mobile handover management apparatus of any one of (21) to (22), wherein the selection unit is further configured to select a candidate geographic region along the motion trajectory before the distance obtaining unit estimates the distances from the base stations of respective cells in the wireless communication network to the motion trajectory; and the distance obtaining unit is configured to estimate distances from base stations of respective cells in the candidate geographic region to the motion trajectory.

(24) The mobile handover management apparatus of any one of (22) to (23), wherein the distance obtaining unit is configured to calculate a projection point of a base station of each cell to the motion trajectory, and calculate a distance from the base station of the cell to the projection point of the base station as the distance from the base station of the cell to the motion trajectory.

(25) The mobile handover management apparatus of (4), wherein the candidate cell determination unit arranges respective candidate handover cells in the candidate handover cell sequence in an order of the projection points of the base stations of respective candidate handover cells on the motion trajectory according to the motion direction of the mobile device.

(26) The mobile handover management apparatus of any one of (21) to (25), wherein the target cell determination unit comprises: a parameter estimation unit configured to estimate arrival times when the mobile device will arrive at respective candidate handover cells and resident times during which the mobile device resides in respective candidate handover cells according to the motion direction and the motion velocity of the mobile device; a resource estimation unit configured to calculate available resources of respective candidate handover cells for the mobile device according to the arrival times and the resident times; and a target selection unit configured to select the target handover cells from the candidate handover cell sequence according to a position relationship between respective candidate handover cells on the motion trajectory and according to the available resources of respective candidate handover cells for the mobile device.

(27) The mobile handover management apparatus of (26), wherein the target selection unit is configured to calculate ratios of available resources of respective candidate handover cells to bandwidth requirement of the mobile device as reserved request ratios with respect to respective candidate handover cells, and select the target handover cells from respective candidate handover cells according to the reserved request ratios and/or the resident times.

(28) The mobile handover management apparatus of (27), wherein the parameter estimation unit is further configured to estimate power levels required by the mobile device to move in respective candidate handover cells; and the target selection unit is configured to select the target handover cells from respective candidate handover cells according to one or more of the reserved request ratios, the resident times, and the power levels.

(29) The mobile handover management apparatus of any one of (26) to (27), further comprising an updating initiation unit configured to issue an update instruction when a motion status of the mobile device or a status of the target handover cell changes.

(30) The mobile handover management apparatus of (29), further comprising: a trajectory prediction unit configured to predict the motion trajectory of the mobile device in the wireless communication network, wherein the updating initiation unit instructs the trajectory prediction unit to update the motion trajectory of the mobile device when the motion direction of the mobile device changes.

(31) The mobile handover management apparatus of any one of (29) to (30), wherein the updating initiation unit instructs the parameter estimation unit to re-estimate the arrival times when the mobile device will arrive at respective candidate handover cells and/or the resident times when the motion velocity of the mobile device changes.

(32) The mobile handover management apparatus of any one of (30) to (31), wherein the updating initiation unit instructs the target selection unit to re-calculate a relationship between an available resource of a target handover cell and the bandwidth requirement of the mobile device when a reserved resource of the target handover cell changes, such that the target selection unit re-generates the target handover cell sequence according to the relationship.

(33) The mobile handover management apparatus of any one of (22) to (32), wherein the candidate cell determination unit is further configured to decide whether a radio access technology and a resource of each candidate handover cell are available for the mobile device, and to retain the candidate handover cell in the candidate handover cell sequence if the radio access technology and the resource of each candidate handover cell are available for the mobile device.

(34) The mobile handover management apparatus of (33), wherein when the candidate cell determination unit decides that the mobile device can not be supported because the radio access technology supported by or the resource of the target handover cell changes, the candidate cell determination unit instructs the target cell determination unit to re-generate the target handover cell sequence; and when the candidate cell determination unit decides that the mobile device can be supported while the radio access technology supported by or the resource of the target handover cell changes, the candidate cell determination unit instructs the target cell determination unit to re-calculate the reserved request ratio of the available resource of the target handover cell to the bandwidth requirement of the mobile device and to re-generate the target handover cell sequence according to the reserved request ratio.

(35) The mobile handover management apparatus of any one of (33) to (34), wherein the mobile handover management apparatus is connected to cells supporting various radio access technologies in a communication system through a backbone network.

(36) The mobile handover management apparatus of (35), further comprising:
an information acquisition unit configured to acquire from respective cells information on radio access technologies supported by respective cells and transmission resources used by respective cells through the backbone network.

(37) The mobile handover management apparatus of any one of (33) to (36), further comprising: a storage unit configured to store the information on radio access technologies supported by respective cells and transmission resources used by respective cells.

(38) The mobile handover management apparatus of any one of (21) to (37), further comprising: a motion estimation unit configured to estimate the motion direction and the motion velocity of the mobile device according to a motion status of a projection point of the mobile device on the motion trajectory.

(39) The mobile handover management apparatus of any one of (30) to (37), wherein the trajectory prediction unit predicts the motion trajectory of the mobile device by sampling a plurality of positions through which the mobile device passes; and fitting according to the sampled plurality of positions to predict the motion trajectory of the mobile device.

(40) A mobile handover management method in a wireless communication network, comprising: for a mobile device in the wireless communication network, according to a motion trajectory of the mobile device obtained through prediction, selecting a plurality of candidate handover cells to be passed through by the motion trajectory in the wireless communication network to form a candidate handover cell sequence of the mobile device; and generating a target handover cell sequence of the mobile device according to a motion velocity, a motion direction and the candidate handover cell sequence of the mobile device, the target handover cell sequence comprising a plurality of target handover cells to which the mobile device will hand over sequentially when moving along the motion trajectory.

(41) The mobile handover management method of (40), wherein the selecting the plurality of candidate handover cells to be passed through by the motion trajectory to form a candidate handover cell sequence of the mobile device comprises: estimating distances from base stations of respective cells in the wireless communication network to the motion trajectory; and selecting a cell which has a less distance to the motion trajectory than a coverage radius of the cell as the candidate handover cell in the candidate handover cell sequence.

(42) The mobile handover management method of (41), further comprising: selecting a candidate geographic region along the motion trajectory before the estimating the distances from the base stations of respective cells in the wireless communication network to the motion trajectory; and the estimating distances from base stations of respective cells in the wireless communication network to the motion trajectory comprises estimating distances from base stations of respective cells in the candidate geographic region to the motion trajectory.

(43) The mobile handover management method of any one of (41) to (42), wherein the estimating distances from base stations of respective cells to the motion trajectory comprises: calculating a projection point of a base station of each cell to the motion trajectory; and calculating a distance from the base station of the cell to the projection point of the base station as the distance from the base station of the cell to the motion trajectory.

(44) The mobile handover management method of (43), further comprising: arranging respective candidate handover cells in the candidate handover cell sequence in an order of the projection points of the base stations of respective candidate handover cells on the motion trajectory according to the motion direction of the mobile device.

(45) The mobile handover management method of any one of (40) to (44), wherein the generating the target handover cell sequence comprises: estimating arrival times when the mobile device will arrive at respective candidate handover cells and resident times during which the mobile device resides in respective candidate handover cells according to the motion direction and the motion velocity of the mobile device; calculating available resources of respective candidate handover cells for the mobile device according to the arrival times and the resident times; and selecting the target handover cells from the candidate handover cell sequence according to a position relationship between respective candidate handover cells on the motion trajectory and according to the available resources of respective candidate handover cells for the mobile device.

(46) The mobile handover management method of (45), wherein the selecting the target handover cells from the candidate handover cell sequence comprises: calculating ratios of available resources of respective candidate handover cells to bandwidth requirement of the mobile device as reserved request ratios with respect to respective candidate handover cells; and selecting the target handover cells from respective candidate handover cells according to the reserved request ratios and/or the resident times.

(47) The mobile handover management method of (46), wherein the selecting the target handover cells from the candidate handover cell sequence further comprises: estimating power levels required by the mobile device to move in respective candidate handover cells; and the selecting the target handover cells comprises selecting the target handover cells from respective candidate handover cells according to one or more of the reserved request ratios, the resident times, and the power levels.

(48) The mobile handover management method of any one of (40) to (47), further comprising: issuing an update instruction when a motion status of the mobile device or a status of the target handover cell changes.

(49) The mobile handover management method of (48), further comprising: predicting the motion trajectory of the mobile device in the wireless communication network, wherein the motion trajectory of the mobile device is updated when the motion direction of the mobile device changes.

(50) The mobile handover management method (48), further comprising: re-estimating the arrival times when the mobile device will arrive at respective candidate handover cells and/or the resident times when the motion velocity of the mobile device changes.

(51) The mobile handover management method of (49), further comprising: re-calculating a relationship between an available resource of a target handover cell and the bandwidth requirement of the mobile device when a reserved resource of the target handover cell changes; and re-generating the target handover cell sequence according to the relationship.

(52) The mobile handover management method of (41), wherein the selecting the plurality of candidate handover cells to be passed through by the motion trajectory to form a candidate handover cell sequence of the mobile device further comprises: deciding whether a radio access technology and a resource of each candidate handover cell are available for the mobile device, and retaining the candidate handover cell in the candidate handover cell sequence if the radio access technology and the resource of each candidate handover cell are available for the mobile device.

(53) The mobile handover management method of (52), wherein when the mobile device can not be supported because the radio access technology supported by or the resource of the target handover cell changes, the target handover cell sequence is re-generated; and when the mobile device can be supported while the radio access technology supported by or the resource of the target handover cell changes, the reserved request ratio of the available resource of the target handover cell to the bandwidth requirement of the mobile device is re-calculated and the target handover cell sequence is re-generated according to the reserved request ratio.

(54) The mobile handover management method of any one of (52) to (53), further comprising: acquiring from respective cells information on radio access technologies supported by respective cells and transmission resources used by respective cells through a backbone network.

(55) The mobile handover management method of any one of (52) to (54), wherein the information on radio access technologies supported by respective cells and transmission resources used by respective cells is pre-stored in a storage unit.

(56) The mobile handover management method of any one of (40) to (55), further comprising: estimating the motion direction and the motion velocity of the mobile device according to a motion status of a projection point of the mobile device on the motion trajectory.

(57) The mobile handover management method of (49), wherein the predicting the motion trajectory of the mobile device comprising: sampling a plurality of positions through which the mobile device passes; and fitting according to the sampled plurality of positions to predict the motion trajectory of the mobile device.

(58) A mobile user device in a wireless communication network, comprising: a receiving unit configured to receive a target handover cell sequence for the mobile user device, which is generated by a mobile handover management entity in the wireless communication network according to a motion trajectory of the mobile user device obtained through prediction, the target handover cell sequence comprising a plurality of target handover cells to which the mobile device will hand over sequentially when moving along the motion trajectory; and a handover unit configured to hand over to a corresponding target handover cell sequentially according to the target handover cell sequence when the mobile user device moves along the motion trajectory.

(59) A mobile handover management method in a wireless communication network, comprising: receiving, by a mobile user device in the wireless communication network, a target handover cell sequence for the mobile user device, which is generated by a mobile handover management entity in the wireless communication network according to a motion trajectory of the mobile user device obtained through prediction, the target handover cell sequence comprising a plurality of target handover cells to which the mobile device will hand over sequentially when moving along the motion trajectory; and handing over to a corresponding target handover cell sequentially according to the target handover cell sequence when the mobile user device moves along the motion trajectory.

(60) A wireless communication system comprising the mobile handover management apparatus of any one of claims (21) to (39) and the mobile user device of (58).

(61) A motion estimation method for estimating a motion parameter of a mobile device in a wireless communication network, comprising: obtaining a motion trajectory of the mobile device in the wireless communication network; and estimating the motion parameter of the mobile device according to a motion status of a projection point of the mobile device on the motion trajectory.

(62) The motion estimation method of (61), wherein the estimating the motion parameter of the mobile device comprises: projecting a current position of the mobile device onto the motion trajectory; and estimating the motion direction and the motion velocity of the mobile device according to a motion status of the projection point of the mobile device on the motion trajectory.

(63) The motion estimation method of any one of (61) to (62), further comprising: grouping a plurality of mobile devices with the same motion feature into the same mobile device group.

(64) The motion estimation method of (63), wherein the grouping the plurality of mobile devices with the same motion feature into the same mobile device group comprising: deciding whether distances between respective mobile devices keep substantially consistent at a plurality of times, and determining that the mobile devices have the same motion feature if the distances between respective mobile devices keep substantially consistent at a plurality of times.

(65) The motion estimation method of any one of (63) to (64), wherein the grouping the plurality of mobile devices with the same motion feature into the same mobile device group comprising: deciding whether motion directions and motion velocities of respective mobile devices keep substantially consistent at a plurality of times, and determining that the mobile devices have the same motion feature if the motion directions and motion velocities of respective mobile devices keep substantially consistent at a plurality of times.

(66) A motion estimation apparatus for estimating a motion parameter of a mobile device in a wireless communication network, comprising: a trajectory obtaining unit configured to obtain a motion trajectory of the mobile device in the wireless communication network; and an estimation unit configured to estimate the motion parameter of the mobile device according to a motion status of a projection point of the mobile device on the motion trajectory.

(67) A mobile handover management apparatus in a wireless communication network, comprising: an available resource determining module configured to determine an available resource of a candidate handover cell when a mobile device in the wireless communication network needs to perform cell handover; and a handover control module configured to control the cell handover of the mobile device according to the available resource of the candidate handover cell.

(68) The mobile handover management apparatus of (67), wherein the available resource determining module estimates a resident time period during which the mobile device resides in the candidate handover cell and determines the available resource of the candidate handover cell for the mobile device during the resident time period.

(69) The mobile handover management apparatus of (67) to (68), wherein the handover control module selects the candidate handover cell which can provide the available resource for the mobile device as a target handover cell of the mobile device.

(70) The mobile handover management apparatus of any one of (68) to (69), wherein the available resource determining module estimates the resident time period during which the mobile device resides in the candidate handover cell according to a motion direction and a motion velocity of the mobile device and coverage of the candidate handover cell.

(71) A mobile handover management method in a wireless communication network, comprising: determining an available resource of a candidate handover cell when a mobile device in the wireless communication network needs to perform cell handover; and controlling the cell handover of the mobile device according to the available resource of the candidate handover cell.

(72) The mobile handover management method of (71), wherein the determining an available resource of a candidate handover cell comprises: estimating a resident time period during which the mobile device resides in the candidate handover cell and determining the available resource of the candidate handover cell for the mobile device during the resident time period.

(73) The mobile handover management method of any one of (71) to (72), wherein the controlling the cell handover of the mobile device according to the available resource of the candidate handover cell comprises: selecting the candidate handover cell which can provide the available resource for the mobile device as a target handover cell of the mobile device.

(74) The mobile handover management method of any one of (72) to (73), wherein the estimating a resident time period during which the mobile, device resides in the candidate handover cell comprises: estimating the resident time period during which the mobile device resides in the candidate handover cell according to a motion direction and a motion velocity of the mobile device and coverage of the candidate handover cell.

(75) A computer storage medium on which a computer-readable computer program code is recorded, the computer-readable computer program code, when being read and executed by the computer, causing the computer to perform a mobile handover management method in a wireless communication network which comprises: for a mobile device in the wireless communication network, according to a motion trajectory of the mobile device obtained through prediction, selecting a plurality of candidate handover cells to be passed through by the motion trajectory in the wireless communication network to form a candidate handover cell sequence of the mobile device; and generating a target handover cell sequence of the mobile device according to a motion velocity, a motion direction and the candidate handover cell sequence of the mobile device, the target handover cell sequence comprising a plurality of target handover cells to which the mobile device will hand over sequentially when moving along the motion trajectory.

(76) A computer storage medium on which a computer-readable computer program code is recorded, the computer-readable computer program code, when being read and executed by the computer, causing the computer to perform a mobile handover management method in a wireless communication network which comprises: receiving, by a mobile user device in the wireless communication network, a target handover cell sequence for the mobile user device, which is generated by a mobile handover management entity in the wireless communication network according to a motion trajectory of the mobile user device obtained through prediction, the target handover cell sequence comprising a plurality of target handover cells to which the mobile device will hand over sequentially when moving along the motion trajectory; and handing over to a corresponding target handover cell sequentially according to the target handover cell sequence when the mobile user device moves along the motion trajectory.

(77) A computer storage medium on which a computer-readable computer program code is recorded, the computer-readable computer program code, when being read and executed by the computer, causing the computer to perform a motion estimation method for estimating a motion parameter of a mobile device in a wireless communication network which comprises: obtaining a motion trajectory of the mobile device in the wireless communication network; and estimating the motion parameter of the mobile device according to a motion status of a projection point of the mobile device on the motion trajectory.

(78) A computer storage medium on which a computer-readable computer program code is recorded, the computer-readable computer program code, when being read and executed by the computer, causing the computer to perform a mobile handover management method in a wireless communication network which comprises: determining an available resource of a candidate handover cell when a mobile device in the wireless communication network needs to perform cell handover; and controlling the cell handover of the mobile device according to the available resource of the candidate handover cell.

It is to be highlighted that the item "including/comprising" when using herein refers to the existence of a feature, element, step or component, but not exclusive of the existence or addition of one or more other features, elements, steps or components.

Moreover, the method of the disclosure is not limited to be performed sequentially in the temporal order described in the specification, and can also be performed in parallel or separately. Thus, the performing order of the method described in the specification does not limit the technical scope of the disclosure.

Although the present has been disclosed by describing the embodiments of the disclosure, it should be understood that various modifications, improvements or equivalents can be made to the disclosure by those skilled in the art within the spirit and scope of the appended claims. These modifications, improvements or equivalents should also be considered as within the scope of protection of the disclosure.

The invention claimed is:

1. A mobile management handover system comprising: circuitry configured to:
sample plurality of positions of a user device (UE) with a sampling frequency that is dynamically adjusted depending on motion rates of the UE,
predict a trajectory of the UE based on the sampled plurality of positions,
identify candidate target handover cells based on the trajectory of the UE,
determine available resources of the candidate target handover cells of the UE,
select a target handover cell from the candidate target handover cells based on the available resources of each of the candidate target handover cells and a residency duration of the UE within each of the candidate target handover cells, and
request reservation of the available resources by the target handover cell.

2. The mobile management handover system according to claim 1, wherein the circuitry is further configured to estimate the residency duration of the UE based on a movement characteristic of the UE and cell coverage of the candidate target handover cells.

3. The mobile management handover system according to claim 1, wherein the circuitry determines the available resources as resources available during a time of residency of the UE in a corresponding candidate target handover cell.

4. The mobile management handover system according to claim 1, wherein the circuitry is further configured to base the selection of the target handover cell on a comparison between the available resources and UE resource requirements.

5. The mobile management handover system according to claim 1, wherein the circuitry is further configured to base selection of the target handover cell in a transmit power required for communication between the UE and the candidate target handover cells.

6. The mobile management handover system according to claim 1, wherein the circuitry is further configured to predict the trajectory of the UE to identify cells located about the trajectory as candidate target handover cells.

7. The mobile management handover system according to claim 6, wherein the circuitry is further configured to select a plurality of cells along the trajectory as a sequence of target handover cells.

8. The mobile management handover system according to claim 6, wherein the circuitry determines a plurality of locations intersecting a current trajectory thereof and predicts a future trajectory of the UE based on the plurality of locations.

9. The mobile management handover system according to claim 6, wherein the circuitry uses navigation information based on a source and destination of the UE to predict the trajectory.

10. The mobile management handover system according to claim 6, wherein the circuitry is further configured to identify the candidate target handover cells as cells whose distance from a base station thereof to the trajectory of the UE is less than a corresponding cell coverage radius.

11. The mobile management handover system according to claim 1, wherein the trajectory of the UE is determined based on triangulation.

12. The mobile management handover system according to claim 1, wherein the circuitry is further configured to update selection of the target handover cell based on at least one of a change in available resources and a change in residency duration.

13. The mobile management handover system according to claim 1, wherein the circuitry obtains the available resources from a database.

14. The mobile management handover system according to claim 1, wherein the circuitry communicates with the candidate target handover cells to obtain the available resources.

15. The mobile management handover system according to claim 1, wherein the circuitry is further configured to identify candidate target handover cells based on a radio access technology thereof.

16. The mobile management handover system according to claim 1, wherein the circuitry is further configured to
calculate the available resources for each of the candidate target handover cells based on the residency duration of the UE based on a predicted trajectory of the UE,
select the target handover cell by assigning a priority level to each candidate target handover cell based on resource requirements and the available resources of each of the candidate target handover cells, wherein a first target handover cell with more available resources than a second target handover cell is assigned a higher priority level, classify the candidate target handover cells based on the assigned priority levels, and generate a sequence of the available resources of all the cells on the predicted trajectory based on the classification.

17. A method of mobile handover management, comprising:

sampling plurality of positions of a user device (UE) with a sampling frequency that is dynamically adjusted depending on motion rates of the UE;

predicting a trajectory of the UE based on the sampled plurality of positions;

identifying candidate target handover cells based on the trajectory of the UE;

determining, with circuitry, available resources of the candidate target handover cells of the UE;

selecting a target handover cell from the candidate target handover cells based on the available resources of each of the candidate target handover cells and a residency duration of the UE within each of the candidate target handover cells; and requesting reservation of the available resources by the target handover cell.

18. A non-transitory computer-readable medium encoded with computer-readable instructions thereon that, when executed by a computer, cause the computer to perform a method comprising:

sampling plurality of positions of a user device (UE) with a sampling frequency that is dynamically adjusted depending on motion rates of the UE;

predicting a trajectory of the UE based on the sampled plurality of positions;

identifying candidate target handover cells based on the trajectory of the UE;

determining, available resources of the candidate target handover cells of the UE;

selecting a target handover cell from the candidate target handover cells based on the available resources of each of the candidate target handover cells and a residency duration of the UE within each of the candidate target handover cells; and requesting reservation of the available resources by the target handover cell.

* * * * *